(12) United States Patent
Hayes et al.

(10) Patent No.: US 10,546,544 B1
(45) Date of Patent: Jan. 28, 2020

(54) ELECTROWETTING ELEMENT WITH MULTIPLE ELECTRODES

(71) Applicant: Amazon Technologies, Inc., Seattle, WA (US)

(72) Inventors: Robert Andrew Hayes, Hong Kong (CN); Gor Manukyan, Veldhoven (NL); Melanie Maria Hubertina Wagemans, Aarle-Rixtel (NL); Daniel Figura, Piestany (SK); Bokke Johannes Feenstra, Nuenen (NL); Toru Sakai, Waalre (NL)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 15/617,729

(22) Filed: Jun. 8, 2017

(51) Int. Cl.
*G09G 3/34* (2006.01)
*G02B 26/00* (2006.01)
*G09G 3/20* (2006.01)

(52) U.S. Cl.
CPC ........... *G09G 3/348* (2013.01); *G02B 26/005* (2013.01); *G09G 3/2007* (2013.01); *G09G 2320/066* (2013.01); *G09G 2330/02* (2013.01)

(58) Field of Classification Search
CPC .... G02B 26/005; G02B 26/004; G02B 26/00; G02B 2207/115; G02B 26/02; G09G 3/348; G09G 5/00; G09G 2310/0289; G09G 2320/04
See application file for complete search history.

(56) References Cited

U.S. PATENT DOCUMENTS

| | | | |
|---|---|---|---|
| 4,569,575 A | 2/1986 | Le Pesant et al. | |
| 4,636,785 A | 1/1987 | Le Pesant | |
| 6,417,868 B1 * | 7/2002 | Bock | G09G 3/3607 345/698 |
| 7,180,677 B2 * | 2/2007 | Fujii | G02B 26/005 359/295 |
| 7,872,790 B2 | 1/2011 | Steckl et al. | |
| 9,424,797 B1 | 8/2016 | Sandock et al. | |

(Continued)

FOREIGN PATENT DOCUMENTS

| | | |
|---|---|---|
| WO | 2007141218 A1 | 12/2007 |
| WO | 2011051413 A1 | 5/2011 |
| WO | 2013087897 A1 | 6/2013 |

OTHER PUBLICATIONS

United States of America Final Office action dated May 23, 2019 for U.S. Appl. No. 15/617,689.

(Continued)

*Primary Examiner* — Towfiq Elahi
(74) *Attorney, Agent, or Firm* — EIP US LLP

(57) ABSTRACT

An electrowetting display device comprising an electrowetting element comprising a control system, a first fluid, a second fluid immiscible with the first fluid, and a first and second support plate. A first and second electrode are, respectively, overlapped by a first and second portion of a surface of the first support plate. The control system is operable to apply a sequence of voltages, comprising a first voltage between the second fluid and the first electrode and a second voltage between the second fluid and the second electrode, to configure the first fluid to a plurality of configurations, each of the plurality of different configurations respectively corresponding to the same grey level.

20 Claims, 19 Drawing Sheets

(56) References Cited

U.S. PATENT DOCUMENTS

| | | |
|---|---|---|
| 2007/0075941 A1 | 4/2007 | Zhou et al. |
| 2008/0204370 A1 | 8/2008 | Feenstra et al. |
| 2009/0127123 A1 | 5/2009 | Raccurt et al. |
| 2011/0069374 A1 | 3/2011 | Yamazaki |
| 2013/0016515 A1 | 1/2013 | Chang et al. |
| 2015/0084942 A1* | 3/2015 | Mennen .................. G09G 5/00 345/212 |
| 2016/0114320 A1* | 4/2016 | Pollack ............... B01F 11/0071 204/450 |
| 2017/0004780 A1 | 1/2017 | De Greef et al. |

OTHER PUBLICATIONS

United States of America Non-Final Office action dated Dec. 13, 2018 for U.S. Appl. No. 15/617,689.
United States of America Non-Final Office action dated Apr. 24, 2019 for U.S. Appl. No. 15/617,933.

* cited by examiner

ELECTROWETTING ELEMENT WITH MULTIPLE ELECTRODES

BACKGROUND

Electrowetting display devices are known. In an off state of a known electrowetting element an oil layer covers a display area. In an on state the oil layer is retracted so as to cover less of the display area. To switch the electrowetting element to the on state a voltage is applied via an electrically conductive fluid immiscible with the oil. To switch the electrowetting element to the off state, the voltage is switched off. By switching the oil and the electrically conductive fluid to different fluid configurations, different optical states can be displayed by the electrowetting element.

It is known to control the movement of the oil and the electrically conductive fluid for example by providing a surface in the electrowetting element with a different wettability for the oil than for the electrically conductive fluid or by appropriately selecting the shape of the electrowetting element to cause a preferred direction of motion of the fluids upon application of a non-zero voltage.

It is desirable to provide improved techniques for fluid motion control in an electrowetting element.

SUMMARY

In some embodiments, an electrowetting display device is provided. The device includes an electrowetting element comprising a first fluid, a second fluid immiscible with the first fluid a first support plate comprising a surface, the first fluid in contact with at least a portion of the surface, a first electrode overlapped by a first portion of the surface, and a second electrode overlapped by a second portion of the surface, with the first portion and the second portion non-overlapping each other, and a second support plate, the first fluid and the second fluid located between the first support plate and the second support plate, and a control system operable to apply a sequence of voltages to configure the first fluid to a plurality of different configurations, each of the plurality of different configurations respectively corresponding to a same grey level, the sequence of voltages comprising a first voltage between the second fluid and the first electrode; and a second voltage between the second fluid and the second electrode.

In some embodiments, a display apparatus is provided. The apparatus includes an electrowetting element comprising a first fluid, a second fluid immiscible with the first fluid, a first support plate comprising a hydrophobic surface, at least one wall corresponding to a perimeter of the hydrophobic surface, a first electrode overlapped by a first portion of the hydrophobic surface, and a second electrode overlapped by a second portion of the hydrophobic surface, with the first portion and the second portion non-overlapping each other, and a second support plate, the first fluid and the second fluid located between the first support plate and the second support plate, at least one processor, and at least one memory comprising computer program instructions, the at least one memory and the computer program instructions operable to, with the at least one processor: apply a sequence of voltages to configure the first fluid to a plurality of different configurations, each of the plurality of different configurations respectively corresponding to a same grey level, the sequence of voltages comprising a first voltage between the second fluid and the first electrode, and a second voltage between the second fluid and the second electrode.

In some embodiments, an electrowetting display device is provided. The device includes an electrowetting element comprising a first fluid, a second fluid immiscible with the first fluid, a first support plate comprising a surface, the first fluid in contact with at least a portion of the surface, a first electrode overlapped by a first portion of the surface, and a second electrode overlapped by a second portion of the surface, with the first portion and the second portion non-overlapping each other, and a second support plate, the first fluid and the second fluid located between the first support plate and the second support plate, and a control system operable to apply a sequence of voltages to translate the first fluid over the surface during display of a first grey level, the sequence of voltages comprising: a first voltage between the second fluid and the first electrode, and a second voltage between the second fluid and the second electrode.

DETAILED DESCRIPTION

Examples are described herein of an electrowetting element with a first fluid, such as an oil, and a second fluid, such as an electrolyte, that is immiscible with the first fluid. A support plate of the electrowetting element for example includes two electrodes. In response to data indicative of a grey level, for example corresponding to a particular display effect for the electrowetting element to display, a first voltage may be applied between one of the two electrodes and the second fluid and subsequently a second voltage may be applied between the other of the two electrodes and the second fluid. In such examples, the first voltage may be applied to contract or retract the first fluid so that the first fluid is at least partly retracted from the surface of the electrowetting element. For example, the first fluid may be in the form of a droplet, blob or globule on the surface. The first fluid may then be translated across the surface by application of the second voltage. Thus, by applying the first voltage and the second voltage, the position of the first fluid for a particular grey level, or display state to be displayed by the electrowetting element, can be controlled.

In further examples of controlling an electrowetting element with a support plate with two electrodes, a first voltage may be applied between one of the two electrodes and the second fluid in response to first data indicative of a first grey level. A second voltage may then be applied between the other of the two electrodes and the second fluid in response to second data indicative of a second grey level. This can improve the flexibility of control of the first fluid. For example, instead of motion of the first fluid initiating repeatedly at the same initiation location in the electrowetting element and the first fluid collecting repeatedly at the same collection location (which is typically different from the initiation location), motion of the first fluid may initiate at different positions or locations and the first fluid may, similarly, collect at different locations over time. This therefore allows the first fluid motion to be controlled more flexibly, which may improve the display quality of the electrowetting element.

The structure of an example electrowetting element and its operation as part of an electrowetting display device will first be described with reference to FIG. 1. Subsequently, the operation of an electrowetting display device according to examples will be described in more detail.

Figure 1:
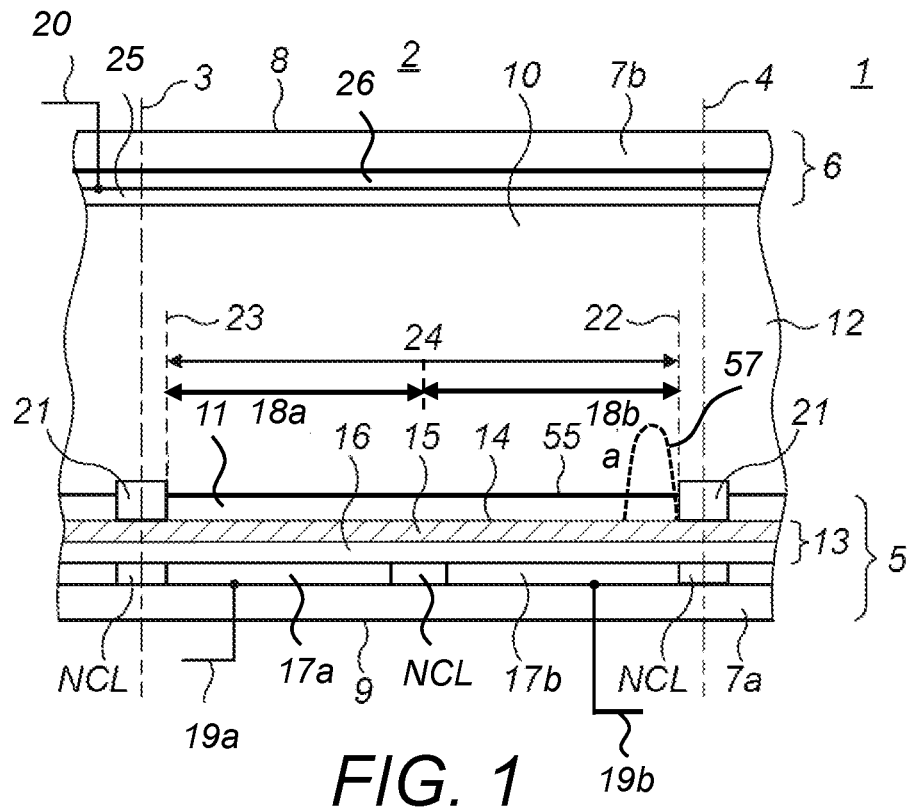
FIG. 1 shows a cross-section of an example electrowetting element.

FIG. 1 shows a diagrammatic cross-section of part of an example of an electrowetting display device 1, which may be referred to as a display device. The electrowetting display device 1 includes a plurality of electrowetting elements 2, which may otherwise for example be referred to as picture elements, display elements or electrowetting cells, one of which is shown in the Figure. The lateral extent of the electrowetting element is indicated in FIG. 1 by two dashed lines 3, 4. The electrowetting elements comprise a first support plate 5 and a second support plate 6. The support plates may be separate parts of each electrowetting element or the support plates may instead be shared in common by the plurality of electrowetting elements. The first support plate 5 and the second support plate 6 may include first and second substrates 7a, 7b, which may be made of glass or polymer. One or both of the first and second support plates 5, 6 may be rigid or flexible.

The electrowetting display device 1 has a viewing side 8 on which an image or display effect formed by the display device can be viewed and a rear side 9. In the Figure a side of the first support plate 5 corresponds with the rear side 9 and a side of the second support plate 6 corresponds with the viewing side 8. Alternatively, in other examples, a side of the first support plate may correspond with the viewing side. The display device may be of the reflective, transmissive or transflective type. The display device may be an active matrix driven display device. The plurality of electrowetting elements may be monochrome. For a color display device the electrowetting elements may be divided in groups, each group having a different color; alternatively, an individual electrowetting element may be able to show different colors.

The second support plate 6 is positioned such that a first fluid 11 and a second fluid 12 are located between the first support plate 5 and the second support plate 6, in a space 10 between the first support plate 5 and the second support plate 6, sometimes referred to as a cavity. In the example of FIG. 1, each electrowetting element 2 includes a respective portion of the first fluid 11 and the second fluid is shared by the array of electrowetting elements. However, in other examples, each electrowetting element may include an individual or separate portion of the second fluid, for example where the second fluid is not shared by the array of electrowetting elements. At least one of the first and second fluids may be a liquid. The second fluid is immiscible with the first fluid in examples such as that of FIG. 1. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids at least partially meet, for example contact, each other at an interface labelled 55 in FIG. 1 for when no voltage is applied and labelled 57 for when a voltage is applied, which interface typically corresponds to a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive or polar and may be water, or a salt solution such as a solution of potassium chloride in water. In examples, the second fluid is polar and in some examples is electrically conductive, but in other examples is not electrically conductive. Electrically conductive typically refers to a second fluid capable of conducting electricity for example. For example an electrical current may flow through the second fluid due to the flow of ions through the second fluid. In examples, a polar fluid, such as a polar second fluid, includes at least one compound (for example a liquid vehicle) having a molecule with a net dipole. Thus, across the molecular structure the molecule may have an overall dipole moment, due to an electron distribution, with at least one part of the molecule having a negative electrical charge and at least one different part of the molecule having a positive electrical charge. Such dipole moments may include permanent dipoles. The polarity is caused for example by the presence of one or more atom to atom bonds in the molecule, with for example one of the atoms being a heteroatom such as oxygen or nitrogen. For example, such a polar atom to atom bond is a bond between an oxygen (O) atom and a hydrogen (H) atom, i.e. an —O—H bond. The second fluid may be transparent.

The first fluid is typically electrically non-conductive and may for instance be an alkane like hexadecane or may be an oil such as silicone oil. The first fluid is therefore non-polar in at least some examples.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, for example absorb substantially all parts of the visible spectrum, or reflecting. A reflective first fluid may reflect the entire visible spectrum, making the layer appear white, or part of it, making it have a color. In some examples, the first fluid is black and therefore absorbs substantially all parts of the optical spectrum, for example in the visible light spectrum. In other examples, the first fluid is another color than black and absorbs another part of the optical spectrum, for example a sub-range of wavelengths within the visible spectrum. In other examples, the display device includes electrowetting elements having first fluids which are respectively red, green or blue, or cyan, magenta and yellow to provide a full color display. Typically, by absorbing substantially all parts of the optical spectrum, there is nonetheless a degree of variation, therefore the first fluid may not absorb all wavelengths, but the majority of wavelengths within a given spectrum such as the visible spectrum, so as to perform the function of the first fluid in the electrowetting element. The first fluid may therefore be configured to absorb substantially all light incident on the first fluid. For example the first fluid may absorb 90% or more of light in the visible spectrum and incident on the first fluid.

The first support plate 5 includes an insulating layer 13. The insulating layer 13 may be transparent or reflective. The insulating layer 13 may extend between walls 21 of an electrowetting element 2. To avoid short circuits between the second fluid 12 and electrodes arranged under the insulating layer, layers of the insulating layer may extend uninterrupted over a plurality of electrowetting elements 2, as shown in FIG. 1. The insulating layer has a surface 14 facing the space 10 of the electrowetting element 2. In this example the surface 14 is hydrophobic, although in other examples the surface may have different wettability properties or may include a hydrophobic portion and a hydrophilic or less hydrophobic portion. The thickness of the insulating layer may be less than 2 micrometers and may be less than 1 micrometer. The surface 14 is in contact with at least one of the first fluid or the second fluid, depending on the fluid configuration as described below. The surface 14 may be considered to be a first surface or a top surface of the first support plate 5. The first support plate 5 also has an opposing second surface, which is on the opposite side of the first support plate 5 than the first surface. The second surface may therefore be considered to be a bottom surface of the first support plate 5 in the orientation illustrated in FIG. 1. For example, the bottom surface of the first support plate 5 may be the surface of the first substrate 7a that is closest to or faces the rear side 9.

The insulating layer may be a hydrophobic layer; alternatively, it may include a hydrophobic layer 15 and a dielectric layer 16 with predetermined dielectric properties, the hydrophobic layer 15 facing the space 10, as shown in FIG. 1 The hydrophobic layer is schematically illustrated in FIG. 1 and may be formed of Teflon® AF1600. The dielectric layer 16 may have a thickness, taken in a direction perpendicular to a plane of the substrate, of between 5 nanometers and several micrometers, for example between 50 nanometers and 2 micrometers or 3 micrometers. In other examples the thickness may be between 50 nanometers and 500 nanometers. The dielectric layer may be made of an inorganic material like silicon oxide or silicon nitride.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

The first fluid 11 in this example is substantially confined to an electrowetting element by walls 21 that follow the cross-section of the electrowetting element. For example, the first fluid 11 may remain within the electrowetting element 2 within operational tolerances. In such cases, a relatively small amount of the first fluid 11 may nevertheless transfer to an adjacent or neighboring electrowetting element, for example by spilling over a wall 21 due to an impact on the first or second support plate or another shock, which may compress the first and second fluids 11, 12 and cause the first fluid 11 to be expelled from the electrowetting element 2. The amount of first fluid 11 that transfers in this way is generally sufficiently small to avoid adversely affecting the display quality or the contrast of the electrowetting element 2. The extent of the electrowetting element, indicated by the dashed lines 3 and 4, is taken between the center of the walls. The area of the surface 14 between the walls of an electrowetting element, indicated by the dashed lines 22 and 23, is called the display area 24, over which a display effect occurs.

In examples, the walls 21 may extend from the first support plate 5 to the second support plate 6, or the walls may extend only partly from the first support plate 5 to the second support plate 6 as shown in FIG. 1. Although the walls 21 are shown as structures protruding from the insulating layer 13 in the example of FIG. 1, in other examples the walls may instead be formed by a surface layer of the support plate that acts as a boundary to retain fluid 11 by repelling the first fluid. For example, walls 21 may be formed by providing a portion of the surface 14 with a substantially different wettability. For example, the walls may include a hydrophilic or less hydrophobic layer. In further examples, the walls may include any combination of materials, including materials that extend away from the first support plate and surface layers with a substantially different wettability than a portion of the display area 24.

The walls 21 may be a plurality of separate structures, for example that are adjoining, in contact with each other or sufficiently close to substantially confine the first fluid 11 with the electrowetting element 2. In other examples, though, the walls 21 may form a single substantially continuous (for example continuous within manufacturing tolerances) or continuous structure per electrowetting element or across a portion or the entirety of the electrowetting display device 1.

An electrowetting element in examples such as that of FIG. 1 includes at least one electrode as part of the first support plate 5. In the example of FIG. 1, the electrowetting element 2 includes a first electrode 17a and a second electrode 17b. A respective portion of a surface of the electrowetting element, which in this example is the surface 14 of the hydrophobic layer 15 between the walls 21 of the electrowetting element 2, overlaps each respective electrode. A first portion 18a of the surface 14 of the electrowetting element 2 overlaps the first electrode 17a and a second portion 18b of the surface 14 of the electrowetting element 2 overlaps the second electrode 17b. The first portion 18a and the second portion 18b are non-overlapping in examples. In other words, the first and second portions 18a, 18b are different areas or regions of the surface, which do not coincide with or cover each other. However, the first and second portions 18a, 18b may be adjacent or neighboring each other, without overlapping each other. In the example of FIG. 1, the first portion 18a and the second portion 18b together form the entirety of the surface 14 of the hydrophobic layer 15 but in other examples, the surface may include at least one other portion or region than the first portion 18a and the second portion 18b. The first electrode 17a and the second electrode 17b in FIG. 1 are smaller in size, for example occupying a smaller area in a plane of the first substrate 7a than the first portion 18a and the second portion 18b respectively. The first and second electrodes 17a, 17b are nevertheless entirely overlapped by the first and second portions 18a, 18b respectively. However, in other examples, the first and second electrodes may not be completely overlapped by the first and second portions 18a, 18b respectively. For example, instead, substantially all, such as 90% of, the first and second electrodes 17a, 17b may be overlapped by the first and second portions 18a, 18b respectively, or the first and second electrodes 17a, 17b may be overlapped by less than 90% of the first and second portions 18a, 18b. Furthermore, in examples, the first electrode 17a and the second electrode 17b may be the same size as, for example aligned with and completely overlapped by, the first and second portions 18a, 18b respectively, or different sizes or misaligned with the first and second portions 18a, 18b respectively. In examples, a first electrode 17a may be considered to be overlapped by the first portion 18a where the first portion 18a covers, extends or lies over the first electrode 17a or vice versa, and similarly for the second electrode 17b and the second portion 18n.

As will be appreciated by the skilled person, the arrangement of the electrodes 17a, 17b in the example of FIG. 1 is not intended to be limiting. In examples, a first support plate of an electrowetting element may include any number of electrodes, each associated with a different respective surface portion.

In examples, the first electrode 17a may have substantially the same optical properties as the second electrode 17b. For example, the first electrode and the second electrode 17a, 17b may both interact with light, such as visible light, in substantially the same manner, for example the same within measurement tolerances. Optical properties typically include at least one of a reflectivity, a transmissivity, an absorptivity or other characteristic that governs or determines how a material interacts with electromagnetic radiation. For example, the first electrode and the second electrode 17a, 17b may be made from or include the same materials, or materials that have the same or substantially the same optical properties.

The first electrode 17a may be reflective for light of at least one wavelength, for example a first wavelength, and the second electrode 17b may also be reflective for light of the at least one wavelength, for example for the first wavelength. For example, both the first and second electrodes 17a, 17b may be reflective for light of substantially all wavelengths in the visible spectrum, for example a majority or all wavelengths in the visible spectrum or a sufficiently large number of wavelengths to operate as a reflector in a reflective electrowetting element 2. Alternatively, both the first and second electrodes 17a, 17b may be reflective for light of a predetermined range of wavelengths in the visible spectrum, such as a range of wavelengths corresponding to a particular color, to create a colored display effect by reflection of light from the first and/or second electrodes 17a, 17b.

In cases in which the first electrode 17a and the second electrode 17b are reflective, the first electrode 17a may be arranged to reflect light of the at least one wavelength, for example light of the first wavelength, from first incident light incident on the first electrode 17a after transmission through the second support plate 6 and the second electrode 17b may be arranged to reflect light of the at least one wavelength, for example light of the first wavelength, from second incident light incident on the second electrode 17b after transmission through the second support plate 6. In other words, a first reflective surface of the first electrode 17a may be positioned to reflect light of the first wavelength from the first incident light incident on the first electrode 17a after transmission through the second support plate 6 and a second reflective surface of the second electrode 17b may be positioned to reflect light of the first wavelength from the second incident light incident on the second electrode 17b after transmission through the second support plate 6. For example, one or both of the first reflective surface and the second reflective surface may face the second support plate 6 or the viewing side 9 of the electrowetting element 2 as shown in FIG. 1, to receive ambient light entering the electrowetting element from an external environment. In other examples in which the viewing side and the rear side are reversed, the first reflective surface and the second reflective surface may each face the viewing side, which may for example correspond with a side of the first support plate 5 rather than a side of the second support plate 6.

In other examples, such as examples in which the electrowetting element 2 is arranged for transmissive operation, the first electrode 17a may be transmissive for light of substantially all wavelengths in the visible spectrum and the second electrode 17b may also be transmissive for light of substantially all wavelengths in the visible spectrum. In yet further examples, such as examples in which the electrowetting element 2 is a transflective electrowetting element, the first electrode and the second electrode may have different optical properties than each other. For example, one of the first electrode and the second electrode may be reflective for light of at least one wavelength or for substantially all wavelengths in the visible spectrum and the other of the first electrode and the second electrode may be transmissive for light of substantially all wavelengths in the visible spectrum.

The first and second electrodes 17a, 17b are electrically insulated from the first and second fluids 11, 12 by the insulating layer 13 in the example of FIG. 1. In some examples, further layers may be arranged between the insulating layer 13 and the first and second electrodes 17a, 17b. The first and second electrodes 17a, 17b are separated from electrodes of the first support plate 5 of neighboring electrowetting elements by an electrically non-conductive layer NCL in FIG. 1. In the example of FIG. 1, the first electrode 17a is also separated from the second electrode 17b by an electrically non-conductive layer NCL. However, in other examples, the first electrode 17a may be separated from the second electrode 17b by a different electrically insulative layer. For example, the insulating layer 13 may extend between the first electrode 17a and the second electrode 17b to insulate the first and second electrodes 17a, 17b from each other.

The first electrode 17a and the second electrode 17b can be of any desired shape or form. The first electrode 17a and the second electrode 17b are supplied with voltage signals by first and second signal lines 19a, 19b respectively, schematically indicated in FIG. 1.

A second signal line 20 is connected to an additional electrode 25 that is in electrical contact with the electrically conductive or polar second fluid 12. The additional electrode 25 may be common to all elements, for example when they are fluidly interconnected by and share the second fluid 12, uninterrupted by walls. The electrowetting element 2 can be controlled by a voltage V applied between the signal lines 19a and 20 and/or between the signal lines 19b and 20 and hence between the first electrode 17a and the second fluid 12 and/or between the second electrode 17b and the second fluid 12. The first and second electrodes 17a, 17b may be coupled to a display driving system. For example, in a display device having the electrowetting elements arranged in a matrix form, the first and second electrodes 17a, 17b can be coupled to a matrix of control lines on the substrate 7a via the first and second signal lines 18a, 18b. The signal line 20 may also be coupled to the display driving system or to a separate or different display driving system.

A display effect provided by the electrowetting element 2 may depend on an extent that the first fluid 11 and the second fluid 12 adjoin or contact the surface corresponding with the display area, in dependence on the magnitude of the applied voltage V described above. The magnitude of the applied voltage V therefore determines the configuration of the first and second fluids within the electrowetting element. In other words, the display effect depends on the configuration of the first and second fluid in the electrowetting element, which configuration depends on the magnitude of the voltage applied between the electrodes of the electrowetting element. For example, for controlling the configuration of the first and second fluids, a constant potential may be applied to the additional electrode 25 in contact with the electrically conductive or polar second fluid 12 and the magnitude of a potential applied to at least one of the first electrode 17a and the second electrode 17b may be controlled. The display effect gives rise to a display state of the electrowetting element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively. Thus, the display effect may in effect be controlled by controlling a configuration of the first fluid (and consequently the second fluid).

In examples described herein, when a zero or substantially zero voltage is applied between the first electrode 17a and the additional electrode 25 and between the second electrode 17b and the additional electrode 25, for example when the electrowetting element is in an off state, the first fluid 11 forms a layer between the walls, as shown in FIG. 1 with the reference numeral 55. Typically, substantially zero in examples refers to a voltage which is minimal, for example as close to zero that the first fluid adjoins a maximum extent of the display area 24. Application of a voltage will retract the first fluid, for example against a wall as shown by the dashed shape 57 in FIG. 1. The controllable shape of the first fluid, in dependence on the magnitude of the applied voltage, is used to operate the electrowetting element to provide a display effect over the display area 24. For example, switching the fluids to increase adjoinment of the second fluid 12 with the display area 24 may increase the brightness of the display effect provided by the element.

This display effect determines the display state of the electrowetting element which an observer will see when looking towards the viewing side of the display device. The display device is capable of providing display states from black to white, including various intermediate grey states; in a color display device, the display state may also include color.

In examples such as that of FIG. 1, the electrowetting element 2 includes a color filter 26 overlapping at least the first electrode 17a and the second electrode 17b. The color filter 26 may overlap or cover the entire surface 14 or display area 24 of the electrowetting element 2 or substantially all of the display area 24, for example 90% or more of the display area 24, or the color filter 26 may overlap a smaller portion of the display area 24 than 90%. There may be a single non-white color filter per or corresponding to each electrowetting element 2. In such cases, each electrowetting element 2 may act as a color filter of a particular color. In other examples, though, an electrowetting element may be associated with more than one non-white color filter or vice versa. For example, an electrowetting element may include a plurality of color filters each of a different color from each other, such as a red color filter, a blue color filter and a green color filter. In these examples, each color filter may be considered to correspond to a different respective sub-pixel of the electrowetting element. The color filter 26 may be located in any suitable location within the electrowetting element 2. For example, the color filter 26 may be a layer of the first support plate 5 or of the second support plate 6; in FIG. 2, the second support plate 6 includes the color filter 26. Where the first support plate 5 includes the color filter 26, the color filter 26 may be located between a reflector (such as a reflective electrode) and the surface 14, which is adjoined by at least one of the first or second fluids 11, 12 in examples in which the electrowetting element 2 operates in a reflective manner.

As the skilled person will appreciate, a color filter is typically one or more layers of a material which are configured to filter light incident on the filter. Indeed, a combination of layers in cross-section of an electrowetting element may together filter out light of one or many wavelengths to provide an output color effect and thereby act as a color filter. For example, the color filter may remove or filter out a portion of light entering the color filter. The light that is filtered out is for example of one or a band of many wavelengths and/or colors of light. So, a color filter generally has a degree of transparency to permit light not removed by the color filter to be transmitted through the color filter. The filtering property of a color filter depends for example on a material the color filter is formed of or includes. Examples of a material for forming the color filter include a resist material such as the JSR OPTMER™ CR series, which are pigment dispersed photo-resists.

The color filter 26 may be a non-switchable color filter; in other words, the color filter 26 may have a fixed shape so that a spatial configuration of the non-switchable color filter 26 is not changeable, for example is not switchable. Thus, the non-switchable color filter 26 may be a non-fluid color filter. This may be contrasted with for example the first fluid described above, which may include a dye or pigment to act as a color filter which is switchable between different first fluid configurations. The color filter 26 may further contribute to a display effect provided by the electrowetting element 2, in addition to a configuration of the first and second fluids 11, 12.

Figure 2:
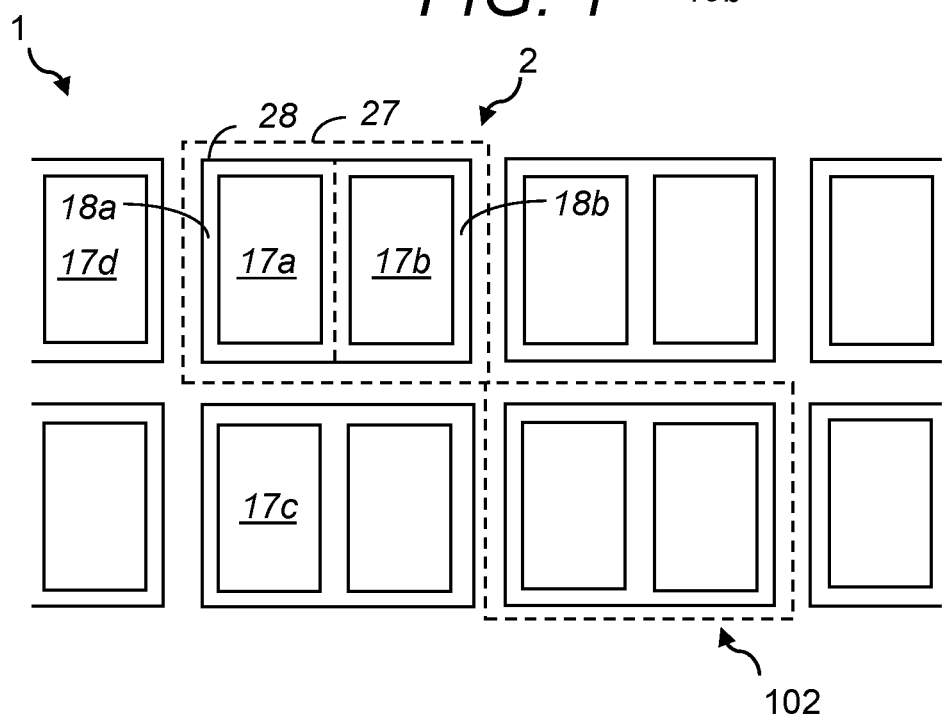
FIG. 2 is a plan view of part of an example electrowetting display device including the example electrowetting element of FIG. 1.

FIG. 2 shows a plan view of part of the electrowetting display device 1 of FIG. 1, illustrating the electrowetting element 2 of FIG. 1. The lateral dimension of the electrowetting element 2 in FIG. 2, corresponding to the dashed lines 3 and 4 of the electrowetting element 2 in FIG. 1, is indicated by the dashed line 27. Line 28 indicates the inner border of the walls 21 of FIG. 1; this line 28 is also the edge, for example a perimeter, of the surface 14 of the first support plate 5, which for example corresponds with the display area 24. The first and second portions 18a, 18b of the surface 14, which in this example overlap the first and second electrodes 17a, 17b respectively, are also labelled in FIG. 2.

The electrowetting display device 1 of FIGS. 1 and 2 includes a plurality of electrowetting elements. In FIG. 2, the electrowetting element 2 illustrated in FIG. 1 is labelled, as is a further electrowetting element 102. The further electrowetting element 102 in this example is the same as the electrowetting element 2. Further labelling of the further electrowetting element 102 is therefore omitted in FIG. 2, for clarity. The electrowetting elements may be arranged in a matrix configuration, for example as an array or matrix of n rows and m columns, where each of n and m are integers. Each of n and m may be ≥2; the total number of electrowetting elements in this example is n×m. Each electrowetting element of the matrix may be the same as each other or some of the electrowetting elements may differ from each other.

In the example of FIG. 2, as in other examples, the first electrode 17a and the second electrode 17b are arranged in a row, with the first electrode 17a adjacent to the second electrode 17b. In such examples, the first electrode 17a and the second electrode 17b may be aligned with each other, for example such that the first electrode 17a and the second electrode 17b lie on the same axis, for example an axis that passes through a center of the first and second electrodes 17a, 17b along a row of the electrowetting elements. The first and second electrodes 17a, 17b may be considered adjacent or neighboring each other in examples in which there is no other electrode between the first electrode 17a and the second electrode 17b. There are typically other components separating the first and second electrodes 17a, 17b though, such as the non-conductive layer NCL described above with reference to FIG. 1.

In examples such as FIG. 2, in which the electrowetting display device includes a plurality of the electrowetting element 2, a first distance between the first electrode 17a and the second electrode 17b of a first one of the electrowetting element 2 is smaller than a second distance between the first electrode 17a of the first one of the electrowetting element 2 and the first electrode 17c of a second one of the plurality of the electrowetting element 2. In such examples, the first electrode 17a neighbors the first electrode 17c. In other words, electrodes within the same electrowetting element may be closer together than neighboring electrodes in different, neighboring, electrowetting elements. This may increase or maximize a reflective area of the electrowetting element 2, which can increase the contrast ratio of the electrowetting element 2. Typically, the distance between electrodes in neighboring electrowetting elements depends on a thickness of the walls between the neighboring electrowetting elements, as it may be undesirable to locate electrodes underneath the walls, as this may lead to undesirable reflections that may reduce the display quality of the electrowetting element. For example, a distance between electrodes of neighboring electrowetting elements may be the same as or larger than a wall thickness in a plane of the surface 14, for example in a direction perpendicular to an inner surface of the wall, that faces towards a center of the electrowetting element 2. However, in other examples, a distance between electrodes in neighboring electrowetting elements may be independent of a wall thickness or a distance between neighboring electrowetting elements (which may be considered to be an inter-electrowetting-element separation, for example).

At least one of: the first electrode of the first one of the plurality of the electrowetting element, the second electrode of the first one of the plurality of the electrowetting element, the first electrode of the second one of the plurality of the electrowetting element, or the second electrode of the second one of the plurality of the electrowetting element is reflective for light of at least one wavelength in examples. For example, as explained above, the first and second electrodes may both be reflective or may have substantially the same optical properties as each other and this may be the case for first and second electrodes of a plurality of electrowetting elements of the electrowetting display device.

Figure 3:
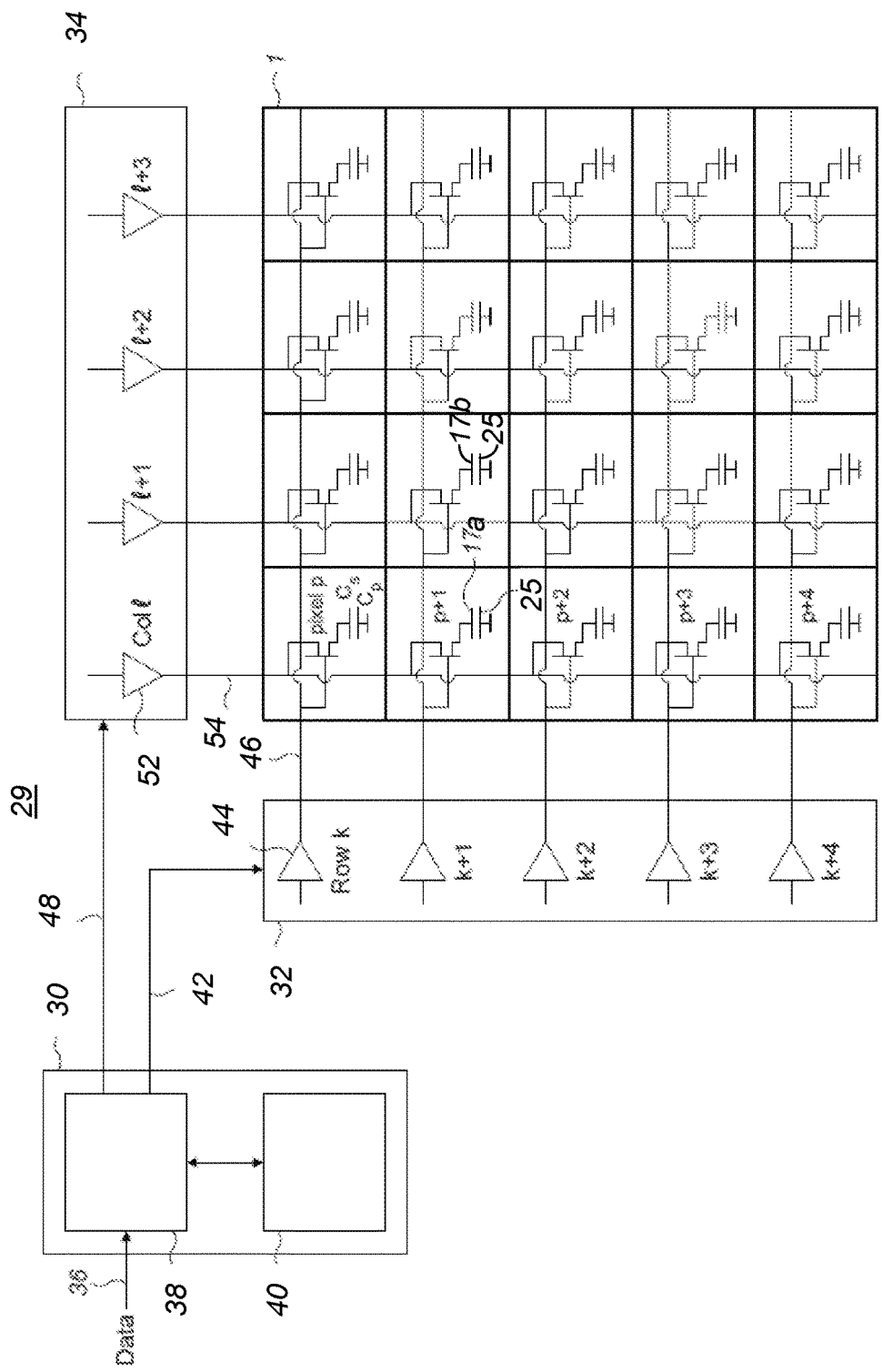
FIG. 3 shows schematically an example of circuitry for controlling an electrowetting display device.

FIG. 3 shows schematically example circuitry 29 for use to control an example electrowetting display device. The electrowetting display device 1 of FIG. 3 may be similar to or the same as the electrowetting display device 1 described above with reference to FIGS. 1 and 2; a corresponding description should be taken to apply. The electrowetting display device 1 is for example a so-called active matrix drive type display apparatus.

A control system, sometimes referred to as a display driving system, may be used to control the electrowetting display device 1. The circuitry 29 of FIG. 3 may be or form part of such a control system or display driving system. The control system in this example includes a display controller or controller 30, a display row driver 32 and a display column driver 34. Data indicative of grey levels, which typically correspond with display states of the electrowetting elements, the display states for example representing a still image or video images, is received by the display controller 30 from an input line 36 to the display driving system. The display controller 30 includes at least one processor 38 for processing the data entered on the input line 36. The at least one processor 38 is connected to at least one memory 40. The display controller 30 prepares the data for use in the electrowetting display device 1 in this example.

The at least one memory 40 may store computer program instructions that are configured to perform one or more of the methods of controlling an electrowetting display device 1 described herein, when being executed by the processor such as the at least one processor 38. For example, the at least one memory 40 and the computer program instructions of the control system may be operable to, with the at least one processor 38, apply a first voltage between the second fluid 12 and the first electrode 17a and, subsequently, apply a second voltage between the second fluid 12 and the second electrode 17b as described further below. The computer program instructions may be stored on a computer program product including a non-transitory computer-readable storage medium. Details of the at least one processor 38 and the at least one memory 40 are described further below with reference to FIG. 13.

An output of the at least one processor 40 is connected by the line 42 to the display row driver 32, which includes row driver stages 44 that transform signals to the appropriate voltages for the electrowetting display device 1. Row lines 46 connect the row driver stages 44 to respective rows of the electrowetting display device 1 for transmitting the voltage pulses generated by the display row driver 32 to electrowetting elements in each row of the electrowetting display device 1, thereby providing a row addressing signal to each row of the electrowetting display device. In other words, one or more voltage pulses for addressing one or more rows is transmitted over the row lines 46 corresponding to the rows to switching elements corresponding respectively to the electrowetting elements in the one or more rows. The display row driver 32 generates the voltage pulses used for addressing the rows of the display device, using information from the at least one processor 40 to set a value of the pulse duration of the voltage pulses.

Another output of the at least one processor 40 is connected by line 48 to the display column driver 34, which includes column driver stages 52 that transform signals to the appropriate voltages for the electrowetting display device 1. Column lines 54 connect the column driver stages 52 to the columns of the electrowetting display device 1, providing a column signal to each column of the electrowetting display device 1. In the example of FIG. 3, the first electrode 17a and the second electrode 17b lie in different columns, for example in adjacent or neighboring columns. Thus, in this example, each electrowetting element 2 is connected to two different column lines 54, one connected to the first electrode 17a and one connected to the second electrode 17b. However, in other examples, the first and second electrodes 17a, 17b may be connected differently to the display column driver 34 or to the column driver stages 52.

The display controller 30 determines which rows are selected for addressing and in which order. The selected rows are consecutively addressed by applying an addressing signal to each of these rows. The addressing may include the steps of determining a value for a first pulse duration corresponding to at least one voltage pulse to be applied to a row of electrowetting elements, generating the at least one voltage pulse having the first pulse duration and transmitting the at least one voltage pulse to the rows to be addressed. In examples where the electrowetting elements of a row are connected to the same row line, addressing a row for example refers to addressing one or more, for example each, electrowetting element of that row. When an electrowetting element is being addressed, the electrowetting element admits the column signal that is applied to the column line to which the electrowetting element is connected. The column signal for an electrowetting element is applied substantially simultaneously with the voltage pulse used for addressing the electrowetting element. The column signal may be considered to be applied substantially simultaneously with the voltage pulse for example where the column signal is present on the column line for at least the pulse duration of the voltage pulse.

In other examples, a column addressing signal may be applied to one or more, for example, each column of the display device to admit a signal level of a row signal to the first electrode 17a or the second electrode 17b. In other words, the functions of the display row driver and display column driver may be swapped, with the display column driver used to generate a voltage pulse for addressing columns of the display device, for example to switch a transistor of each of the electrowetting elements of the column to a conducting state to pass the signal level of the display row driver to the electrowetting element electrode to set the corresponding electrowetting element in a desired display state. In such cases, the first electrode 17a and the second electrode 17b may be located in different rows from each other, for example on neighboring rows.

The display drivers may include a distributor, not shown in FIG. 3, for distributing data input to the display driver over a plurality of outputs connected to the driver stages. The distributor may be a shift register. FIG. 3 shows the lines only for those columns and rows of the electrowetting display device that are shown in the Figure. The display row drivers may be integrated in a single integrated circuit. Similarly, the display column drivers may be integrated in a single integrated circuit. The integrated circuit may include the complete driver assembly. The integrated circuit in examples, such as that of FIG. 3, is integrated on the first support plate 5, although in other examples the integrated circuit may be integrated on the second support plate 6 instead. The integrated circuit may include the entire display driving system. Such an arrangement may be known as a "chip on glass" (COG) construction. In other examples a "chip on foil" (COF) construction may be used, where the display column drivers and/or the display row drivers may be integrated on a foil, which is then arranged on the first or second support plate 5, 6, which foil is connectable to circuit lines of the first or second support plate 5, 6 for driving the electrowetting elements. The integrated circuit may include part or the entire control system of the electrowetting display device 1.

In this example, the electrowetting elements of the electrowetting display device 1 are arranged in a matrix with an active matrix configuration. FIG. 3 shows electrowetting elements for five rows, labelled k to k+4 and four columns labelled l to l+3. The total number of rows and columns for common display devices may range between a few hundred and a few thousand. The electrowetting elements of column l are labelled p to p+4. Each electrowetting element may have the same construction as the electrowetting element 2 in FIG. 1. In this example, each electrowetting element occupies two columns and one row, with each column corresponding to a different electrode of the first and second electrodes 17a, 17b of the first support plate 5. The electrowetting element 2 of FIG. 2 is located in the row k+1 and columns l and l+1 in FIG. 3. Column l is associated with the first electrode 17a and column l+1 is associated with second electrode 17b. With this arrangement, a different potential can be applied to the first electrode 17a and the second electrode 17b when the row k+1 is addressed, as the first electrode 17a and the second electrode 17b are located in the same row of the matrix of electrowetting elements.

As noted above, FIG. 3 shows a few electrical parts of the electrowetting elements. Each electrowetting element 2 of the electrowetting display device 1 includes at least one active element in the form of a switching element. The at least one switching element of an electrowetting element 2 is not necessarily located within the lateral extent of the electrowetting element (for example between the dashed lines 3, 4 as shown in FIG. 1), although it may be. For example, there may be a first switching element connected to the first electrode 17a of the electrowetting element 2 and a second switching element connected to the second electrode 17b of the electrowetting element 2. Nevertheless, if the respective switching element is connected to the first electrode 17a or the second electrode 17b of an electrowetting element, directly or indirectly, the respective switching element may be considered to be included in that electrowetting element. A switching element may be a transistor, for example a thin-film transistor (TFT), or a diode.

The electrodes of the electrowetting element 2 are indicated as two electrowetting element capacitors Cp formed, respectively, by the first electrode 17a and the additional electrode 25 and by the second electrode 17b and the additional electrode 25. The first and second electrodes 17a, 17b may therefore each be considered to correspond to a first plate of a different respective electrowetting element capacitor Cp and the additional electrode 25 may be considered to correspond to a second plate of one of the two electrowetting element capacitors Cp. A line connecting the additional electrode 25 of an electrowetting element capacitor Cp to a common potential, in this example ground, is the common signal line 20. A line connecting the first electrode 17a of an electrowetting element capacitor Cp to the transistor is the first signal line 19a shown in FIG. 1 and a line connecting the second electrode 17b of a different electrowetting element capacitor Cp to the transistor is the second signal line 19b shown in FIG. 1. Thus, in examples, the control system may include first circuitry to apply a first voltage between the second fluid 12 and the first electrode 17a and second circuitry, different from the first circuitry, to apply a second voltage between the second fluid 12 and the second electrode 17b. The first circuitry may for example include the first switching element, and the column driver stage 52 and column line 54 associated with the column of the first electrode 17a. Similarly, the second circuitry may include the second switching element, and the column driver stage 52 and column line 54 associated with the column of the second electrode 17b.

The electrowetting element may include a storage capacitor Cs for storage purposes or for making the duration of the holding state or the voltage applied to the electrowetting element uniform across the electrowetting display device. The storage capacitor Cs may be arranged in parallel with Cp and is not separately shown in FIG. 3. A first plate of the storage capacitor Cs may be connected to a storage control line to which a potential Vstorage is applied and a second plate of the storage capacitor Cs may be connected to the first or second switching element connected to the first or second electrodes 17a, 17b respectively. For example both the first or second electrodes 17a, 17b and the second plate of the storage capacitor Cs may be connected to a drain of a TFT.

As explained above, in examples, the display column driver 34 provides the signal levels corresponding to the input data for the electrowetting elements. The display row driver 32 provides the signals for addressing the row of which the electrowetting elements are to be set in a specific display state. In examples, addressing a row for example refers to applying a signal on the signal line of the row that switches a transistor of each of the electrowetting elements of the row to a conducting state of the transistor. Each row of the n rows of the display device is addressable by a signal such as a voltage pulse; the voltage pulse is applied to a switching element of each of the electrowetting elements (or to a switching element associated with a respective electrode of an electrowetting element if there are a plurality of electrodes of the electrowetting element), in the addressed row for switching the switching element.

The addressing of rows is part of the addressing of electrowetting elements in an active matrix display device. A specific or a specific electrode of an electrowetting element is addressed by applying a voltage to the column in which the specific electrowetting element or electrode of the electrowetting element is located and applying a voltage pulse to the row in which the specific electrowetting element is located.

When the transistor of an electrowetting element receives at its gate a voltage pulse of its row addressing signal, the transistor becomes conducting and it passes the signal level of its display column driver to the first electrode 17a or the second electrode 17b of the electrowetting element 2 (depending on whether the column includes the first electrode 17a or the second electrode 17b), and to the second plate of the storage capacitor Cs in examples with a storage capacitor Cs. In examples, a voltage pulse is a rapid, transient change in the voltage from a baseline value to a higher or lower value, followed by a rapid return or change to the baseline value. The time period between the two subsequent voltage changes of the voltage pulse is called a pulse duration. After the transistor has been switched off, so the transistor is no longer conducting, the voltage over the cell will be substantially maintained until the transistor is switched on again by the next row addressing signal for the electrowetting element or for the respective electrode of the electrowetting element. The time during which the transistor is switched off may be referred to in examples as a holding state. In this active matrix driving method the electrodes of the electrowetting elements are connected to the driver stages briefly at the start of a period during which they show a certain grey level or display effect. During this connection, a voltage related to the desired grey level or display effect is applied between the first electrode 17a and the additional electrode 25 and/or between the second electrode 17b and the additional electrode 25. After the electrowetting element 2 is disconnected from the driver stage, the voltage between the first electrode 17a and the additional electrode 25 and/or between the second electrode 17b and the additional electrode 25 is substantially maintained by one or more capacitors during the period during which the electrowetting element shows the grey level or display effect, for example by one or both of the two electrowetting element capacitors Cp and/or by the storage capacitor Cs. The period during which the voltage is substantially maintained is determined in these examples by the combined capacitance and leakage currents of the capacitors. By using a storage capacitor Cs as well as the two electrowetting element capacitors Cp, the voltage may be substantially maintained for a longer duration than otherwise, although in other examples the electrowetting element need not include a storage capacitor Cs. A voltage may be considered to be substantially maintained for example where a change in the voltage is sufficiently small that it does not cause a visible change in a display state or grey level of an electrowetting element 2. For example, a change in display effect, for example transmission or reflectance, of less than 10% is typically not visible to a viewer. The method is called 'active', because the electrowetting element contains at least one active element, for example a transistor.

The example circuitry 29 of FIG. 3 may be used to control the electrowetting element 2 of FIGS. 1 and 2 as described with reference to FIGS. 4a and 4b and FIGS. 5a to 5f, for example. As will be appreciated by the skilled person, the example circuitry 29 of FIG. 3 may also be adapted for use with electrowetting elements with a first support plate including more than two electrodes, such as the electrowetting elements 202, 302 of FIGS. 6 and 8. In such cases, each electrode may be located in a different column or row from each other and may have appropriate circuitry to receive a respective potential from the display column driver 34 or the display row driver 32, similar to that described above for the first and second electrodes 17a, 17b.

FIGS. 4a and 4b and FIGS. 5a to 5f illustrate different fluid configurations that may be obtained using the example electrowetting element 2 of FIGS. 1 and 2. FIGS. 4a and 4b and FIGS. 5a to 5f show the same part of the electrowetting display device 1 illustrated in FIG. 2, with corresponding elements labelled with the same reference numerals. Some of the reference numerals included in FIG. 2 are omitted in FIGS. 4a and 4b and FIGS. 5a to 5f, for clarity.

Figure 4A:
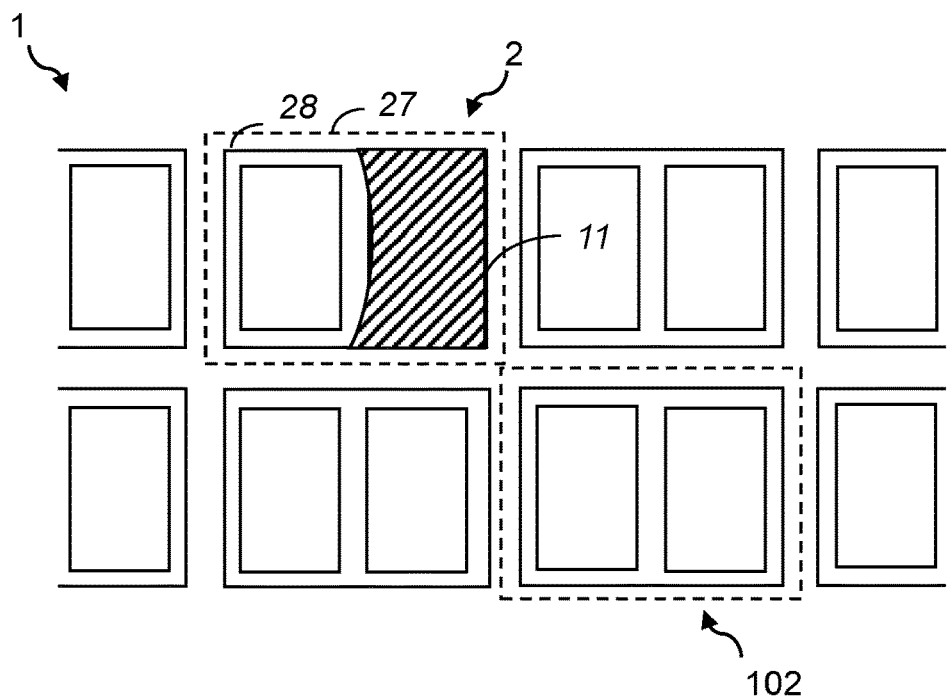
FIGS. 4a and 4b illustrate an example of different fluid configurations for the part of the electrowetting display device of FIG. 2.
Figure 4B:
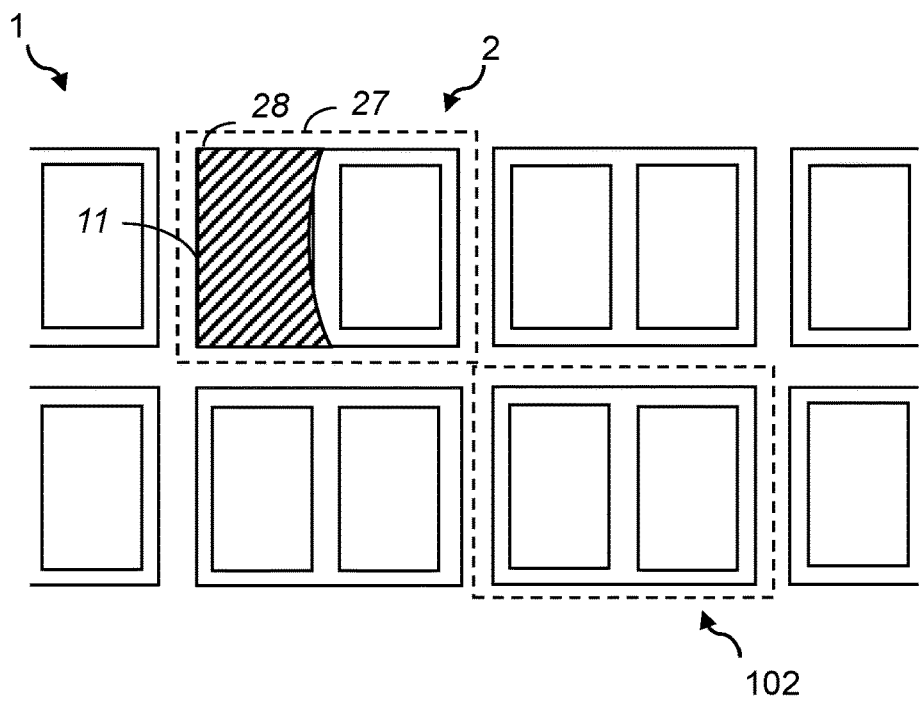

FIGS. 4a and 4b show an example series of fluid configurations that may be obtained by the first fluid and the second fluid in response to input data indicative of a first grey level. The first grey level for example corresponds to one of a series of levels, which may be predetermined levels, between a minimum grey level, which may for example correspond to lightest display state with the first fluid 11 adjoining or contacting a minimum area of the surface, and a maximum grey level, which may for example correspond to a darkest display state, for example with the first fluid 11 spread out to cover the surface 14 of the first support plate 5. For example, the minimum grey level may be considered to correspond to a white display effect (although in practice the display effect may be light grey rather than white) and the maximum grey level may be considered to correspond to a black display effect.

Prior to FIG. 4*a*, the first fluid 11 may for example be in a configuration corresponding to the maximum grey level or darkest display state. In the example of FIGS. 4*a* and 4*b*, the control system of the electrowetting display device 1 is configured to apply a first voltage and, subsequently, a second voltage in response to input data indicative of a first grey level, which is for example a grey level other than the maximum grey level, such as a grey level corresponding to a configuration of the first and second fluids 11, 12 with the first fluid 11 partly retracted from the surface so that both the first and second fluids 11, 12 contact the surface.

Thus, in response to the input data, a first voltage is applied between the second fluid 12 and the first electrode 17*a* to configure the first fluid 11 and the second fluid 12 in a first configuration with the second fluid in contact with at least part of the first portion 18*a*, which overlaps the first electrode 17*a*. This is illustrated in FIG. 4*a*. Thus, with the first voltage applied, the first fluid 11 in this example retracts or contracts away from an area of the surface corresponding to the first electrode 17*a* (which in this example is the first portion 18*a* of the surface). This is due to a larger electric field between the first electrode 17*a* and the second fluid 12, which causes motion of the first fluid 11 in contact with the first portion 18*a* to initiate before motion of the first fluid 11 in contact with the second portion 18*b* due to the preferential adherence of the second fluid 12 to the first portion 18*a* with a voltage applied across the first portion 18*a*. Accordingly, the direction of motion of the first fluid 11 can be controlled, for example so that the first fluid 11 retracts to contact the second portion 18*b*.

In FIG. 4*a* and the other Figures described herein, the first fluid 11 is illustrated with a curved leading edge, with the upper and lower edges of the first fluid 11 in the Figures extending further along the walls than the central portion of the first fluid 11. This may for example be due to surface tension or capillary action acting on the first fluid 11. In other examples, the leading edge of the first fluid 11 may be of a different shape, though. For example, the leading edge of the first fluid 11 may be substantially straight, for example straight within measuring uncertainties, in a central region, and curved at the edges closest to the walls, such as with a curve similar to that shown for the upper and lower edges of the first fluid 11 in FIG. 4*a*. Furthermore, in FIG. 4*a* and the other Figures referred to herein, the first fluid 11 is shown with a leading edge that coincides with the edge of a non-active electrode. For example, in FIG. 4*a*, a higher voltage is applied between the first electrode 17*a* and the second fluid 12 than between the second electrode 17*b* and the second fluid 12. Hence, the second electrode 17*b* may be considered to be a non-active electrode in this example. In FIG. 4*a*, the leading edge of the first fluid 11 approximately aligns with or overlaps the edge of the second electrode 17*b* closest to the first electrode 17*a*. This is due to the electric field between the first electrode 17*a* and the second fluid 12 extending beyond the edge of the first electrode 17*a*, in this example extending to the edge of the second electrode 17*b*. This causes the first fluid 11 to retract beyond the edge of the first electrode 17*a*, to approximately coincide with the edge of the second electrode 17*b*. As the skilled person will appreciate, though, the Figures are merely illustrative of examples. In other examples, the leading edge of the first fluid 11 may be at a different position with respect to the first electrode 17*a* than in FIG. 4*a*. For example, if the voltage between the first electrode 17*a* and the second fluid 12 is lower than in the example of FIG. 4*a* (but still higher than a voltage between the second electrode 17*b* and the second fluid 12), the electric field may not extend as far as in FIG. 4*a*. In this case, the leading edge of the first fluid 11 may be closer to the edge of the first electrode 17*a* than in the example of FIG. 4*a* and may not coincide with the edge of the second electrode 17*b*.

With the first voltage applied between the second fluid and the first electrode 17*a*, a voltage between the second fluid and the second electrode 17*b* has a smaller magnitude than the first voltage in this example. This therefore creates a larger electric field above the first electrode 17*a* than above the second electrode 17*b*, causing the first fluid 11 to translate from contact with the first portion 18*a* to contact the second portion 18*b*, as explained above. For example, a magnitude of the voltage between the second fluid and the second electrode 17*b* may be zero or substantially zero (such as zero within measurement errors) while the first voltage is applied.

In FIG. 4*b*, a second voltage is applied between the second fluid 12 and the second electrode 17*b* to translate the first fluid by configuring the first fluid 11 and the second fluid 12 in a second configuration with the second fluid 12 in contact with at least part of the second portion 18*b*. Translation of the first fluid 11 for example involves movement or motion of the first fluid 11 across or over the surface, for example so that a line along which a boundary between the first fluid and the second fluid meets the surface (sometimes referred to as a three-phase line) also moves across the surface. Translation may therefore involve shifting of the first fluid. Typically, both a leading edge and a trailing edge of the first fluid 11 (in the direction of motion) move during translation of the first fluid 11. In contrast, during retraction or contraction of the first fluid 11, one of the leading edge or the trailing edge of the first fluid 11 may remain in the same position and may be considered a static edge of the first fluid 11, with the other of the leading edge or the trailing edge moving towards the static edge to compress the first fluid, so that the first fluid 11 adjoins or contacts a progressively smaller area of the surface. Similarly, during expansion of the first fluid 11, one of the leading edge or the trailing edge of the first fluid 11 may remain in the same position and may be considered a static edge of the first fluid 11, with the other of the leading edge or the trailing edge moving away from the static edge to expand the first fluid, so that the first fluid 11 adjoins or contacts a progressively larger area of the surface. However, in some cases, translation may also involve contraction or expansion of the first fluid 11. In these cases, a leading edge of the first fluid may move to a larger or greater extent, for example with a larger distance between a final position of the leading edge and an initial position of the leading edge, than a trailing edge of the first fluid (if the first fluid 11 expands) or vice versa (if the first fluid 11 contracts). This may therefore cause a change in the extent or area of contact between the first fluid 11 and the surface.

With the second voltage applied between the second fluid and the second electrode 17*b* to translate the first fluid 11, a voltage between the second fluid and the first electrode 17*a* may have a smaller magnitude than the second voltage in examples. As described above for translation of the first fluid 11 to contact the second portion 18*b*, this creates a larger electric field above the second electrode 17*b* than above the first electrode 17*a*, causing the first fluid 11 to translate from contact with the second portion 18*b* to contact the first portion 18*a*. For example, a magnitude of the voltage between the second fluid and the first electrode 17*a* may be zero or substantially zero (such as zero within measurement errors) while the second voltage is applied. For example, the control system in examples such as that of FIGS. 4*a* and 4*b* may be operable to, in response to the input data indicative of the first grey level, cease or withhold application of the first voltage between the second fluid 12 and the first electrode 17*a* before or at substantially the same time (for example at the same time within measurement uncertainties or while the row corresponding to the second electrode 17*b* is being addressed) as application of the second voltage between the second fluid 12 and the second electrode 17*b*. This may further improve the control of the first and second fluids, for example so that the first fluid 11 is translated as explained above. Similarly, the control system may be operable to cease or withhold application of the second voltage between the second fluid 12 and the second electrode 17*b* before or at substantially the same time as application of the first voltage between the second fluid 12 and the first electrode 17*a*.

In examples such as that of FIGS. 4*a* and 4*b*, the first fluid 11 is in contact with at least part of the second portion 18*b* with the first fluid 11 and the second fluid 12 in the first configuration, and the first fluid 11 is in contact with at least part of the first portion 18*a* with the first fluid 11 and the second fluid 12 in the second configuration. However, in other examples, the first fluid may be in a different location, position or configuration with the first and second fluids 11, 12 in the first or second configurations. Some of these other examples are described further below.

In the example of FIGS. 4*a* and 4*b*, the first and second fluids 11, 12 are in at least two different configurations or positions for the same grey level. Thus, in examples such as this, there may not be a single predefined or predetermined configuration for a particular grey level. Instead, there may be a one-to-many relationship between grey level and fluid configuration. This provides flexibility for control of the fluids. For example, the control system may be operable to apply a sequence of voltages to configure the first fluid to a plurality of different configurations, each of the plurality of different configurations respectively corresponding to the same grey level. The sequence of voltages may include a first voltage between the second fluid and the first electrode 17*a* and a second voltage between the second fluid and the second electrode 17*b*. An extent or area of contact between the first fluid and the surface may be substantially the same, for example the same or the same within measurement errors, for each of the plurality of different configurations. However, a location of contact between the first fluid and the surface may be different for at least two of the plurality of different configurations. In other words, the first fluid may translate over the surface 14 without substantially expanding or contracting to contact different locations of the surface in the at least two of the plurality of difference configurations.

In examples, the control system may be operable to receive first input data indicative of a first grey level and, in response to the first input data, apply a voltage, which may for example be a third voltage between the second fluid and the second electrode, the third voltage corresponding to the first grey level, or a fourth voltage between the second fluid and the second electrode, the fourth voltage corresponding to the first grey level. Alternatively, the control system may be operable to apply a sequence of voltages corresponding to the first grey level to the electrowetting element in response to the first input data, such as the voltages described above with reference to FIGS. 4*a* and 4*b*. Subsequently, the control system may be operable to receive second input data indicative of a second grey level different from the first grey level and select one voltage of a sequence of voltages for application to the electrowetting element consecutively after application of the voltage corresponding to the first grey level. For example, the control system may be operable to select the one voltage of the sequence of voltages in dependence on a configuration of the first fluid with the voltage corresponding to the first grey level applied. For example, in response to application of the fourth voltage corresponding to the first grey level between the second fluid and the second electrode 17*b*, the one voltage selected for application consecutively after the voltage corresponding to the first grey level may be the first voltage for application between the second fluid and the first electrode 17*a*. Conversely, in response to application of the third voltage corresponding to the first grey level between the second fluid and the first electrode 17*a*, the one voltage may be the second voltage for application between the second fluid and the second electrode 17*b*. In other words, the one voltage may be selected to cause the first fluid 11 to be translated from a configuration or position prior to the application of the one voltage, rather than to cause the first fluid 11 to expand or contract without translation. For example, the first voltage may be selected in response to the fourth voltage being applied between the second fluid and the second electrode 17*b* and applied consecutively after the fourth voltage. In contrast, the second voltage may be selected in response to the third voltage being applied between the second fluid and the first electrode 17*a* and applied consecutively after the third voltage. Application of two voltages consecutively for example refers to application of the two voltages one immediately after the other, with no intervening voltages applied therebetween.

The control system may be operable to, in response to the input data indicative of the first grey level, and during display of the first grey level by the electrowetting element 2, apply a sequence of voltages including the first voltage and the second voltage to translate the first fluid 11 substantially continuously across the surface 14. In the example of FIGS. 4*a* and 4*b*, the first fluid 11 may be moved substantially continuously backwards and forwards across the surface 14, so that the first fluid 11 repeatedly switches from contacting at least part of the second portion 18*b* to contacting at least part of the first portion 18*a*. For example, the control system may be operable to cause reciprocating motion of the first fluid across the surface. Reciprocating motion, sometimes referred to as reciprocal motion, is for example a repetitive back-and-forth movement, typically linearly across the surface from one side of the surface to an opposite side of the surface. For example, the first fluid 11 may be moved repeatedly in a linear direction between at least partial contact of the second portion 18*b* and at least partial contact of the first portion 18*a*. Substantially continuous translation may refer to motion of the first fluid that is either continuous or unceasing or that halts or stops but for a relatively short time period such as a time period that would be imperceptible to a viewer or to a time period that is short, for example 10% or less, compared with the time period during which a display state corresponding to the first grey level is to be maintained by the electrowetting element 2 of the electrowetting display device 1. For example, the first fluid 11 may be moved substantially continuously throughout the display of the first grey level by application of the sequence of voltages, for example for all or substantially all, such as at least 90%, of a time period over which the first grey level is displayed.

By translating the first fluid continuously or substantially continuously in response to input data corresponding to a first grey level, the first fluid may be more likely to group together as a single portion or as a smaller number of portions than otherwise. This may improve the quality of the display effect obtained by the electrowetting element, for example by improving contrast.

For example, where the first fluid is colored, portions of the first fluid in the display area of the electrowetting element, e.g. due to break-up of the first fluid layer when a voltage is applied between the first electrode and the second fluid or between the second electrode and the second fluid, can reduce the transmission of light through the display area of the electrowetting element, reducing the display quality of electrowetting element. For example, the display effect obtained with a particular voltage applied to the electrode of the electrowetting element may be darker than intended if first fluid portions are present in the display area, as the light intended to pass through the display area, e.g. from a backlight or from ambient light, is obscured by the colored first fluid portions. This can therefore lead to an incorrect brightness or greyscale being displayed by the electrowetting element. Moreover, it may no longer be possible obtain the whitest or lightest display state, e.g. with the first fluid maximally retracted, as even if a voltage corresponding to such a display state or grey level is applied, portions of the first fluid in the display area would tend to make the display state or grey level appear darker, e.g. with reduced transmission of light through the electrowetting element. Thus, such first fluid portions may reduce the range of display states or grey levels obtainable by the electrowetting element, for example as the lightest state or minimum grey level may be darker than for an electrowetting element which does not suffer from first fluid portions in the display area.

For example, a small portion, droplet or blob of first fluid, sometimes referred to as a satellite, may separate or break up from a larger portion of the first fluid and remain on the first portion 18a of the surface as the first fluid moves to contact the second portion 18b of the surface. However, as in examples the first fluid 11 is controlled to return to its original position or to contact the first portion 18a of the surface as it did previously, the first fluid 11 may collect or coalesce with the remaining small portion on the first portion 18a, to reduce the number of separate portions of first fluid from two to one. This may therefore improve the contrast or display quality as explained above.

In other examples, the sequence of voltages may be applied to obtain reciprocating motion of the first fluid for less than an entire duration of display of a grey level. For example, the sequence of voltages may be used to cause the first fluid to move back and forth a limited number of times. There may then be a pause in motion of the first fluid, for example with the first fluid coming to rest or being stationary, for example before motion of the first fluid resumes or before the first fluid is switched or configured in a configuration corresponding to a different grey level.

In examples as FIGS. 4a and 4b, the control system may therefore be configured to, in response to input data indicative of a grey level such as the first grey level, apply a sequence of voltages between the second fluid and the first electrode and between the second fluid and the second fluid to translate the first fluid across the surface, which is for example a hydrophobic surface, such that the first fluid is in contact with at least part of the first portion at a first time, the first fluid is in contact with at least part of the second portion at a second time subsequent to the first time and the first fluid is in contact with the at least part of the first portion at a third time subsequent to the first time and the second time. For example, the first time, the second time and the third time may be consecutive to each other. In such cases, there may be no intervening voltages between the voltages to obtain, respectively, the configuration of the first fluid in contact with the at least part of the first portion at the first time, the at least part of the second portion at the second time and the at least part of the third portion at the third time.

Control systems in examples such as FIGS. 4a and 4b may further be operable to or configured to apply a sequence of voltages to translate the first fluid over the surface during display of a first grey level, the sequence of voltages including a first voltage between the second fluid and the first electrode and a second voltage between the second fluid and the second electrode. For example, the sequence of voltages may be applied throughout or while the first grey level is being displayed, either for the entirety of or substantially all of (such as at least 90% of) a time during which the first grey level is to be applied or during a portion of the display of the first grey level.

For example, the sequence of voltages may be used to translate the first fluid from being at least partly in contact with the first portion (for example, in a retracted configuration, prior to the configuration illustrated in FIG. 4a) to being at least partly in contact with the second portion (as shown in FIG. 4a) to, subsequently or after the at least partial contact with the second portion, being at least partly in contact with the first portion (as shown in FIG. 4b). In the example of FIGS. 4a and 4b, the control system is operable to apply the sequence of voltages to translate the first fluid from being at least partly in contact with the first portion but not substantially in contact with the second portion, to being at least partly in contact with the second portion but not substantially in contact with the first portion, for example in contact with zero, zero within measurement uncertainties or less than 10% of the first portion, to, subsequently, being at least partly in contact with the first portion but not substantially in contact with the second portion, for example in contact with zero, zero within measurement uncertainties or less than 10% of the second portion.

In examples such as that of FIGS. 4a and 4b, the first fluid may be in contact with a first extent or area of the surface, with the first fluid and the second fluid in the first configuration, and the first fluid may be in contact with a second extent or area of the surface, with the first fluid and the second fluid in the second configuration, the second extent substantially the same size as or smaller than the first extent. For example, a sequence of voltages including the first voltage and the second voltage may be applied to translate the first fluid across the surface with a substantially constant extent or area of contact between the first fluid and the surface. In other words, the first fluid may be translated or moved across the surface by the application of the first and second voltages, without the first fluid substantially or noticeably contracting or expanding. This may allow the grey level displayed by the electrowetting element 2 to be maintained during the application of the first and second voltages. By maintaining a display effect or grey level of the electrowetting element 2 in this way, the effect of backflow, in which the first fluid has a tendency to flow back to cover the surface of the electrowetting element 2 despite a voltage being maintained, may be reduced or eliminated.

The control system may be operable to, in response to the input data indicative of the first grey level, apply a sequence of voltages comprising repeated application of the first voltage between the second fluid and the first electrode and, subsequently, the second voltage between the second fluid and the second electrode. For example, the sequence of voltages may be a series or succession of voltages that are applied sequentially, consecutively or one after the other. In examples, the first voltage and the second voltage may alternate; for example, the first voltage may first be applied, the second voltage may be applied after the first voltage has been applied, and after the second voltage has been applied, the first voltage may be applied again, and so on. In such cases, the second voltage may be removed or a magnitude of the second voltage may be altered while the first voltage is applied and vice versa.

In other examples, though, the sequence may be a non-repeating sequence or may include non-repeating voltages. For example, a duration of application and/or a magnitude of one or both of the first voltage and the second voltage may vary over time. Furthermore, in some cases there may be a gap between application of the first voltage and the second voltage or between application of the second voltage and the first voltage, for example during which no voltage is applied to the electrowetting element. In yet further examples, the first voltage may be applied repeatedly or successively before the second voltage is applied, and vice versa. As the skilled person will appreciate, there are myriad ways in which the first and second voltages may be controlled or configured in order to, for example, obtain a configuration of the first fluid and the second fluid that corresponds with the first grey level, for example with the first fluid moving continuously or substantially continuously.

FIGS. 5a to 5f show a further example series or sequence of fluid configurations that may be obtained with the electrowetting display device 1 partly illustrated in FIG. 1.

Figure 5A:
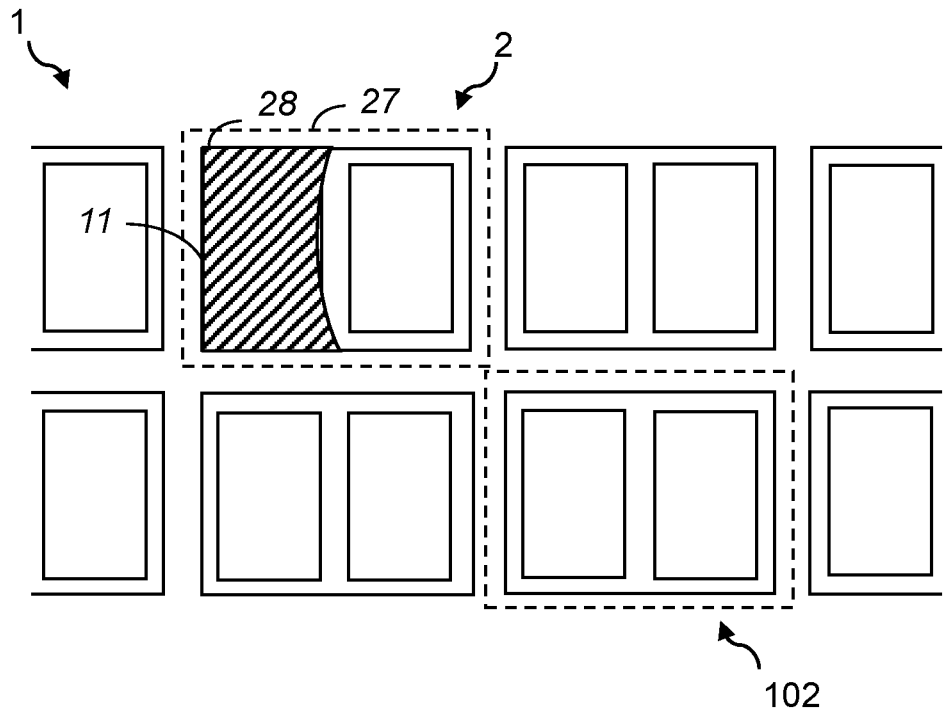
FIGS. 5a to 5f illustrate a further example of different fluid configurations for the part of the electrowetting display device of FIG. 2.

In FIG. 5a, the first fluid 11 is in a retracted configuration with the first fluid at least partly in contact with the first portion 17a but not substantially in contact with the second portion 17b. In this example, the retracted configuration of FIG. 5a is the same as the second configuration illustrated in FIG. 4b. For example, the control system of the electrowetting display device 1 may have a control system operable to, in response to first input data indicative of a first grey level, configure the first fluid in the retracted configuration of FIG. 5a by application of what in this example is referred to as a fifth voltage between the second fluid and the second electrode 17b with a fifth magnitude. In examples in accordance with FIG. 5a, with the fifth voltage applied between the second fluid 12 and the second electrode 17b to configure the first fluid 11 in the retracted configuration, a sixth voltage between the second fluid 12 and the first electrode 17a may be applied with a sixth magnitude smaller than the fifth magnitude of the fifth voltage, for example so that the electric field above the first portion is lower than the electric field above the second portion, so that the first fluid 11 retracts to contact the first portion without substantially contacting the second portion.

In response to input data indicative of a grey level, such as a second grey level, which in this example is a lighter grey level than the first grey level of FIGS. 4a and 4b, with the first fluid 11 more contracted from the surface of the electrowetting element 2, the fluid configurations of FIGS. 5b to 5f may be obtained.

Figure 5B:
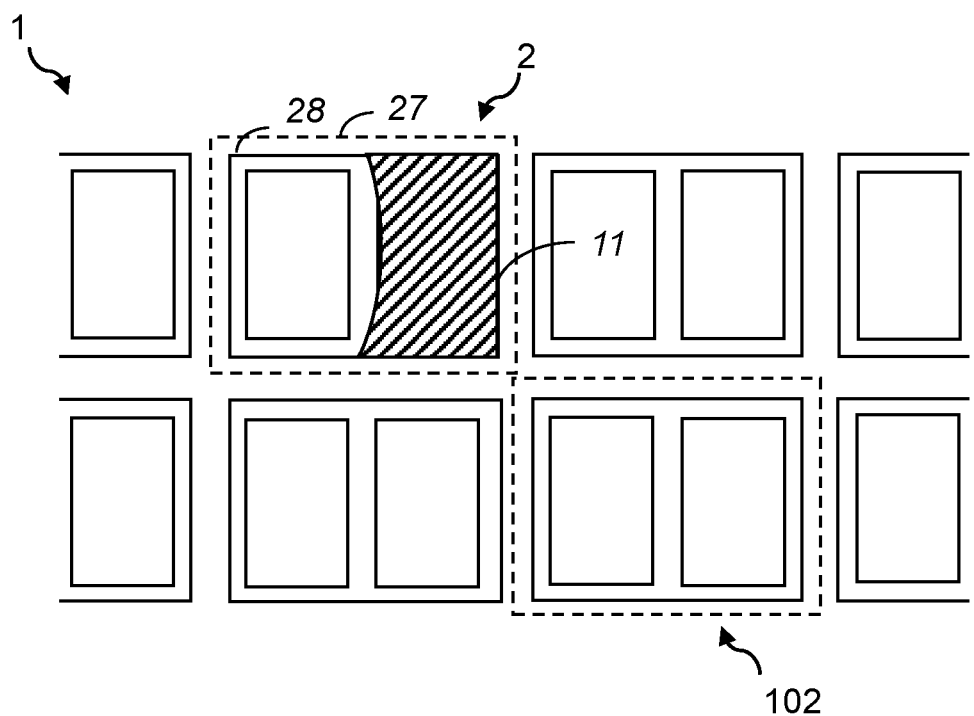

FIG. 5b shows a fluid configuration which is the same as the first configuration of FIG. 4a. In this example, the first fluid configuration of FIG. 5b is obtained by translating the first fluid 11 from contact with the first portion (as shown in FIG. 5a) to contact a first extent or area of the second portion by application of a first voltage between the second fluid 12 and the first electrode 17a. In other words, the first fluid 11 may be considered to contact the second portion over a first area in the first fluid configuration of FIG. 5b. In this example a first magnitude of the first voltage may be larger than the magnitude of the first voltage of FIG. 4a as the second grey level the electrowetting element 2 of FIGS. 5a to 5f is intended to display is lighter than the first grey level of FIGS. 4a and 4b. However, in other examples, the first magnitude of the first voltage for display of the second grey level may be the same as or less than the magnitude of the first voltage for display of the first grey level. With the first voltage applied between the second fluid 12 and the first electrode 17a to translate the first fluid 11, the control system may be operable to apply a third voltage between the second fluid 12 and the second electrode 17b with a third magnitude smaller than the first magnitude, for example to create a smaller electric field above the second electrode 17b so that the first fluid 11 moves towards the second portion.

Figure 5C:
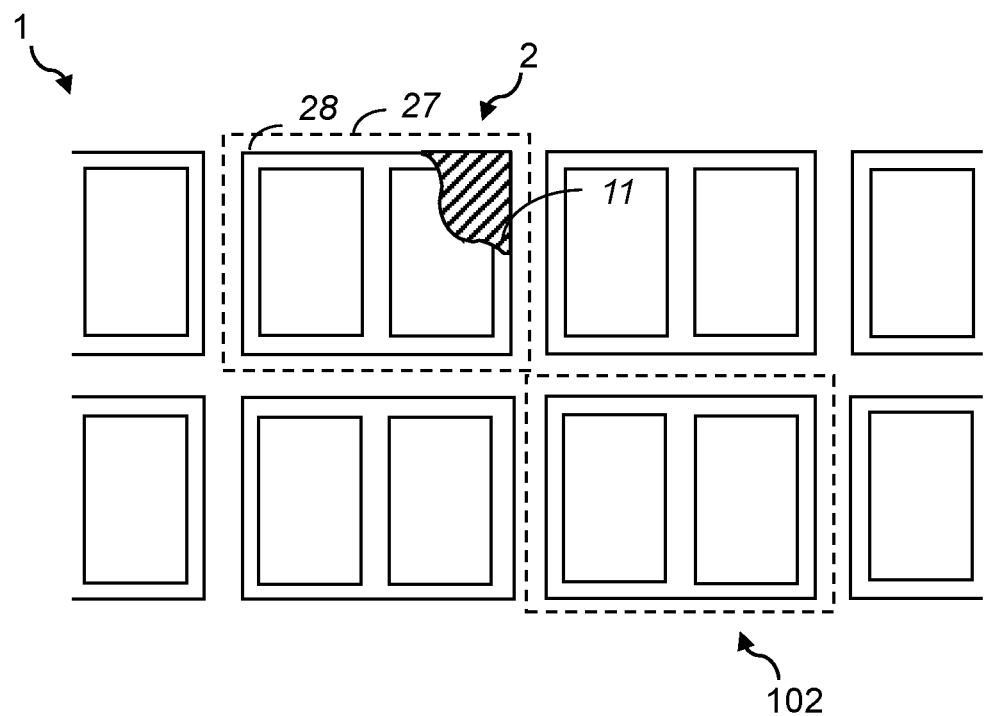

After the first voltage is applied between the first electrode 17a and the second fluid 12, a second voltage is applied between the second electrode 17b and the second fluid 12. This is to retract the first fluid 11 to contact a second extent or area of the second portion, the second extent smaller than the first extent, to obtain the first fluid 11 configuration illustrated in FIG. 5c. In other words, the first fluid 11 may be considered to contact the second portion over a second area in the first fluid configuration of FIG. 5c. Retraction of the first fluid 11 in this way typically uncovers part of the second portion, so that the second extent is smaller than the first extent. With the second voltage applied between the second fluid 12 and the second electrode 17b with a second magnitude to retract the first fluid 11 as shown in FIG. 5c, the control system may be operable to apply a fourth voltage between the second fluid 12 and the first electrode 17a with a fourth magnitude substantially the same as or larger than the second magnitude, for example to prevent the first fluid 11 from flowing back to cover the first portion, due to the higher electric field above the first portion than above the second portion. In this example, the voltage is maintained or increased between the first electrode 17a and the second fluid 12 while the second voltage is applied, for example either by continuing to apply the voltage or by applying a voltage with a larger magnitude or due to the capacitance of the electrowetting element 2. The second magnitude of the second voltage of FIG. 5c may be larger than the fifth magnitude of the fifth voltage to obtain the retracted configuration of the first fluid 11 illustrated in FIG. 5a. As the second grey level is a lighter grey level than the first grey level of FIGS. 4a and 4b and the first grey level of FIG. 5a, the second voltage of FIG. 5c typically has a greater or larger magnitude than the second voltage of FIG. 4b.

With this sequence of voltages, the configuration of the first fluid and the second fluid changes from the configuration of FIG. 5b to that of FIG. 5c, in which the second fluid 12 adjoins or contacts the first portion 18a and part of the second portion 18b and the first fluid 11 contacts part of the second portion 18b. In this example, the configuration of FIG. 5b may therefore be considered an intermediate configuration that is obtained as the first fluid 11 is further retracted or contracted to the configuration of FIG. 5c, which may correspond with a configuration associated with the second grey level. For example, the display effect obtained with the configuration of FIG. 5b may be darker than the desired display effect to correspond to the second grey level. However, by applying the second voltage, the first fluid 11 may continue to retract to the configuration of FIG. 5c, which provides the desired display state.

Figure 5D:
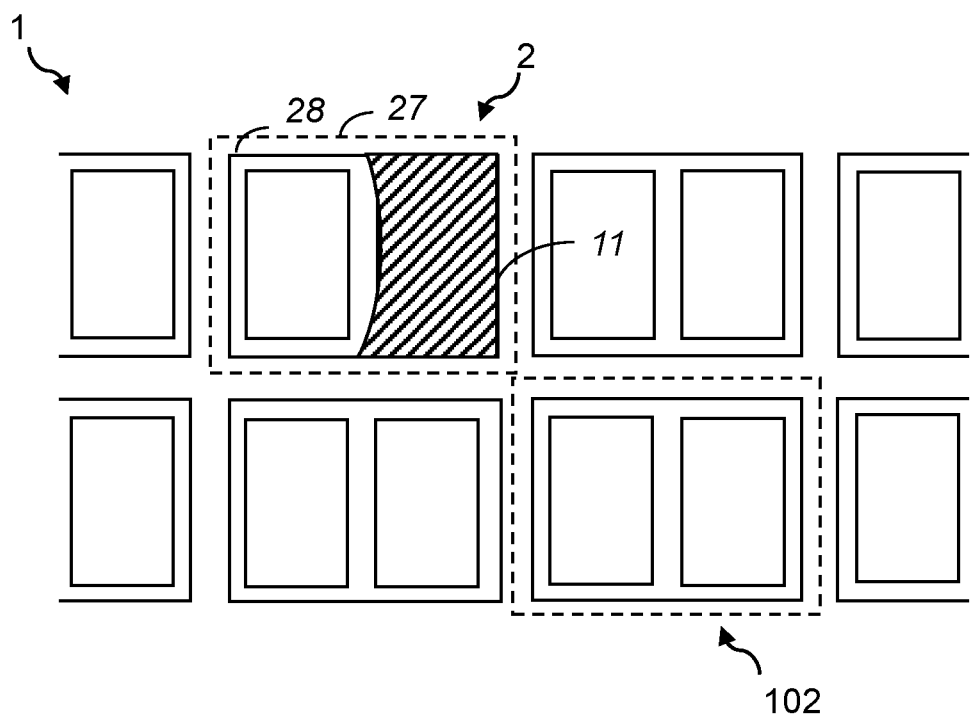
Figure 5E:
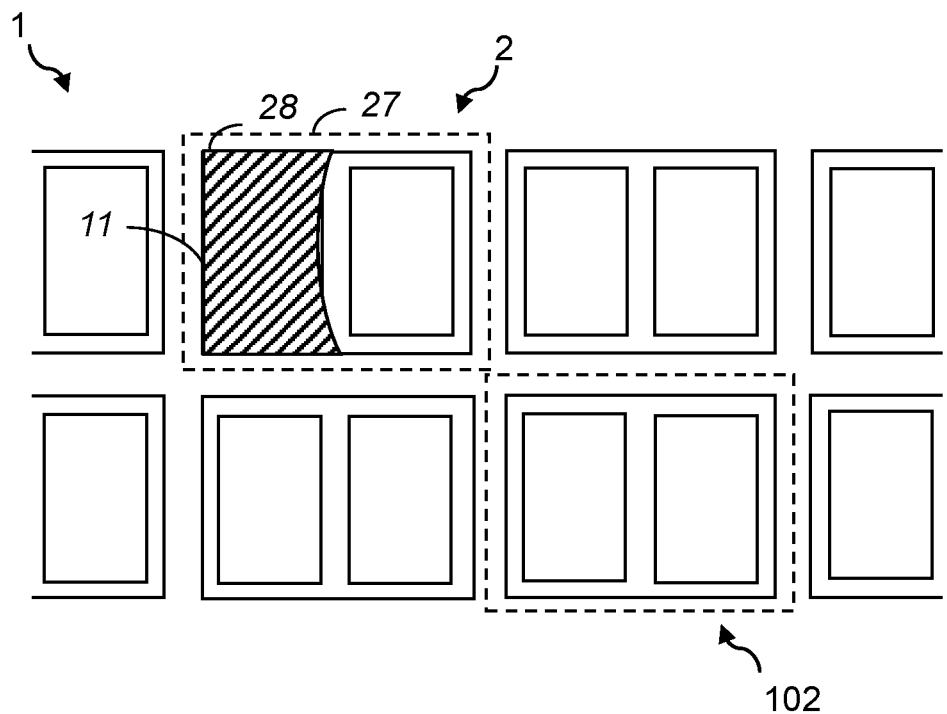
Figure 5F:
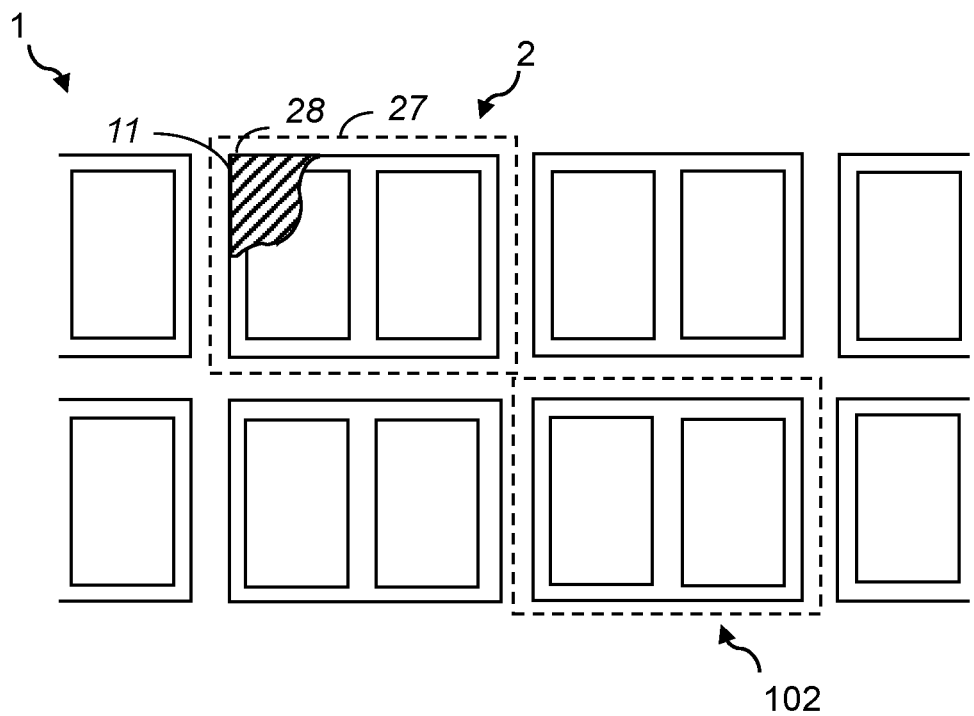

After obtaining the configuration of FIG. 5c, the first voltage between the first electrode 17a and the second fluid 12 and the second voltage between the second electrode 17b and the second fluid 12 may be removed or reduced, allowing the first fluid 11 to relax or expand to the configuration illustrated in FIG. 5d. Subsequently to FIG. 5d, a further voltage may be applied between the second electrode 17b and the second fluid 12 to translate the first fluid 11 to contact the first portion 18a, as shown in FIG. 5e. The further voltage may have the same magnitude as the first voltage of FIG. 5a. Subsequently, a yet further voltage may be applied between the first electrode 17a and the second fluid 12 to retract the first fluid 11 to contact a smaller extent of the first portion 18a in FIG. 5f than the extent of the first portion 18a contacted by the first fluid 11 in FIG. 5e. For example, the yet further voltage may have the same magnitude as the second voltage to retract the first fluid 11 to the configuration illustrated in FIG. 5c. In this way, both the configurations in FIGS. 5c and 5f may correspond to the desired display state.

In examples, the voltage sequence described with reference to FIGS. 5a to 5f may be repeatedly applied, for example similarly to the examples described above with reference to FIGS. 4a and 4b, to translate or move the first fluid continuously back and forth across or over the surface 14 of the electrowetting element 2.

In the examples described above, the first support plate 5 includes two electrodes: the first electrode 17a and the second electrode 17b. However, it is to be appreciated that the examples described above may equally be extended to other examples in which the first support plate includes more than two electrodes. For example, in addition to the first electrode 17a and the second electrode 17b described above, the first support plate may also include a third electrode overlapped by a third portion of the surface, the third portion non-overlapping the first portion and the second portion.

Figure 6:
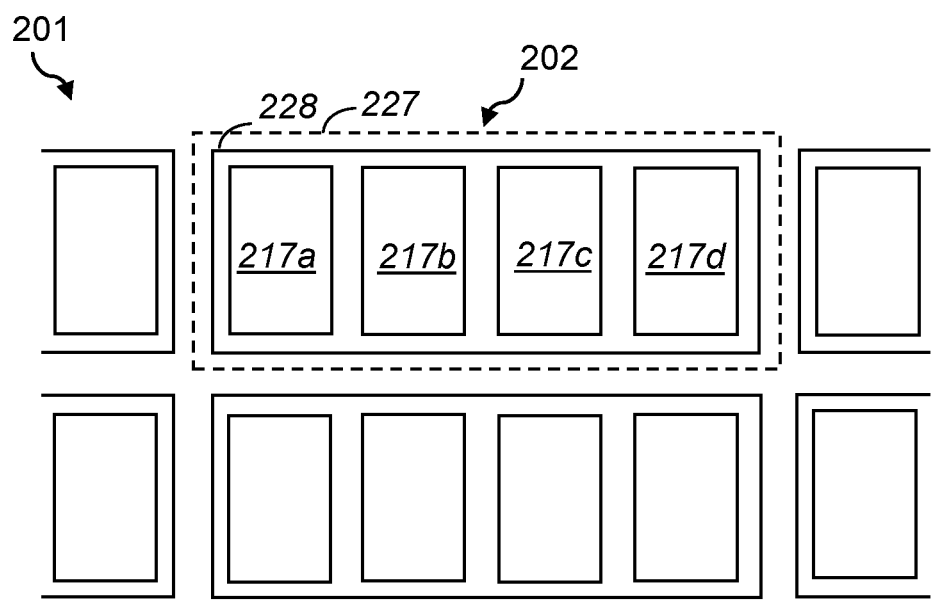
FIG. 6 is a plan view of part of a further example electrowetting display device.

FIG. 6 shows an example in which the first support plate of an example electrowetting element 202 includes a first electrode 217a, a second electrode 217b, a third electrode 217c and a fourth electrode 217d. Other than including four electrodes (and the necessary circuitry for controlling four electrodes) rather than two electrodes, the structure of the electrowetting element 202 of FIG. 6 is otherwise the same as that of the electrowetting element 2 of FIGS. 1 and 2. Similar features are labelled with the same reference numerals but incremented by 200; corresponding descriptions should be taken to apply.

The example electrowetting element 202 of FIG. 6 is illustrated in plan view. In this example, the first and second electrodes 217a, 217b are overlapped by first and second portions of the surface of the first support plate of the electrowetting element 202 similarly to the electrowetting element 2 of FIG. 3. However, in this example, the first and second portions of the surface do not alone make up the display area 24. Instead, the display area 24, which corresponds to the surface 14 of the electrowetting element 2 bounded by the at least one wall 21 also includes a third portion and a fourth portion. The third portion of the surface overlaps the third electrode 217c and the fourth portion of the surface overlaps the fourth electrode 217d. The third portion is non-overlapping the first portion and the second portion and the fourth portion is non-overlapping the first portion, the second portion and the third portion. In other words, the first, second, third and fourth portions may each not overlap or cover each other; they may each be separate, distinct regions of the surface.

In this example, the first electrode 217a, the second electrode 217b, the third electrode 217c and the fourth electrode 217d are arranged in a row. For example, the first, second, third and fourth electrodes 217a, 217b, 217c, 217d may be in the same row of a matrix or array of electrodes, for example corresponding to a matrix or array of electrowetting elements. Other electrode arrangements are possible in other examples though.

FIGS. 7a to 7g show example fluid configurations that may be obtainable by the electrowetting element 202 of FIG. 6 in response to input data indicative of a first grey level. Prior to FIG. 7a, the electrowetting element 202 is in the off state, which for example corresponds with a darkest grey level, with the first fluid 11 covering the surface of the first support plate. Then, the control system of the electrowetting element 202 receives input data corresponding to or representing a first grey level, which may be a grey level other than the darkest grey level.

Figure 7A:
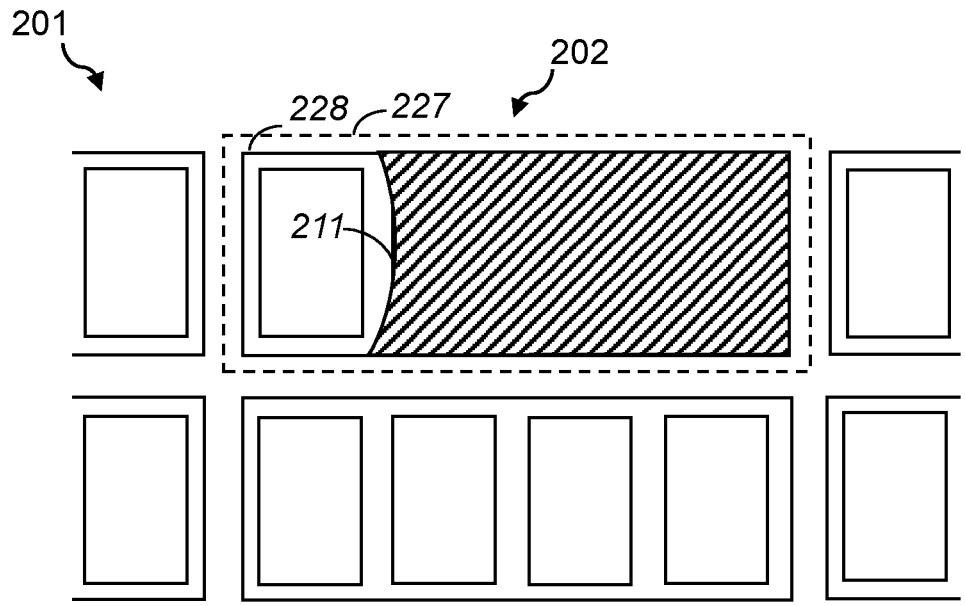
FIGS. 7a to 7g illustrate an example of different fluid configurations for the part of the electrowetting display device of FIG. 6.

In response to the input data, the control system applies a first voltage between the first electrode 217a and the second fluid to configure the first fluid and the second fluid in the first configuration, which is shown in FIG. 7a. In this example, the second fluid is in contact with the first portion of the surface and the first fluid 211 is in contact with the second portion of the surface. The first fluid 211 is also in contact with the third and fourth portions of the surface, as the first fluid 211 has retracted or contracted from the left side of the electrowetting element 202 of FIG. 7a towards the right side of the electrowetting element 202, to uncover the first portion of the first support plate.

Figure 7B:
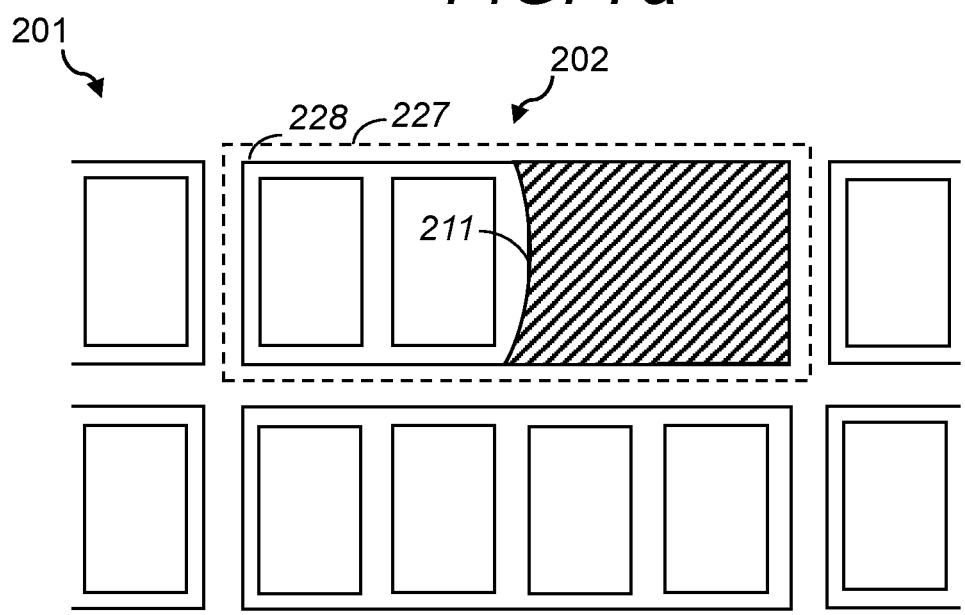

However, in this example, the first grey level is a relatively light grey level, which is for example lighter than the first configuration illustrated in FIG. 7a. Accordingly, the first configuration of FIG. 7a is an intermediate configuration and the first fluid and the second fluid continue to change configuration from that of the FIG. 7a to the second configuration shown in FIG. 7b. In FIG. 7b, a second voltage is applied between the second electrode 217b and the second fluid, subsequently to the application of the first voltage. In this example, in contrast to the example of FIGS. 4b and 5b, the first fluid is in contact with at least part of the third portion with the first fluid and the second fluid in the second configuration. Although this example includes four electrodes, it is to be appreciated that the first fluid may also be in contact with at least part of the third portion with the first fluid and the second fluid in the second configuration in example electrowetting elements with three rather than four electrodes.

Figure 7C:
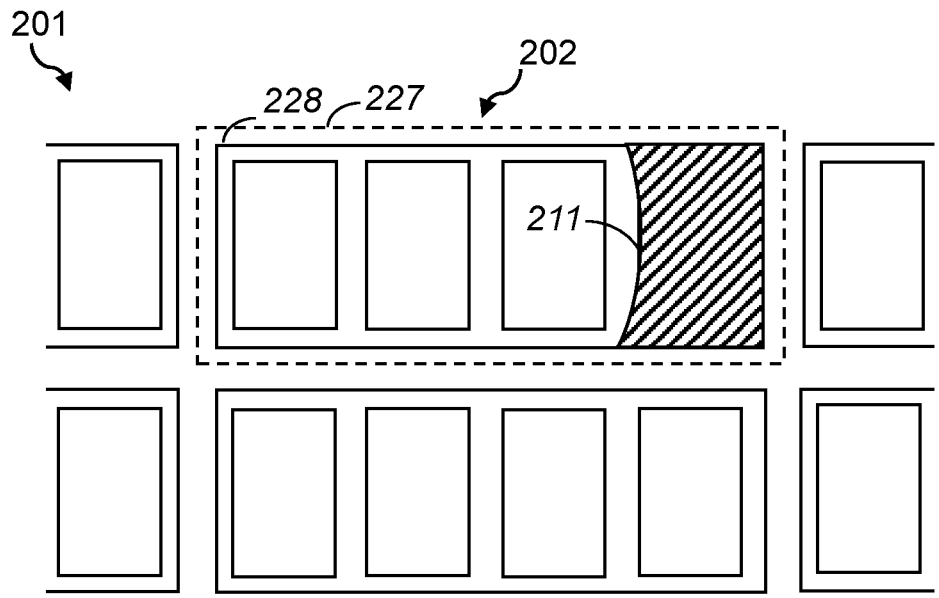
Figure 7D:
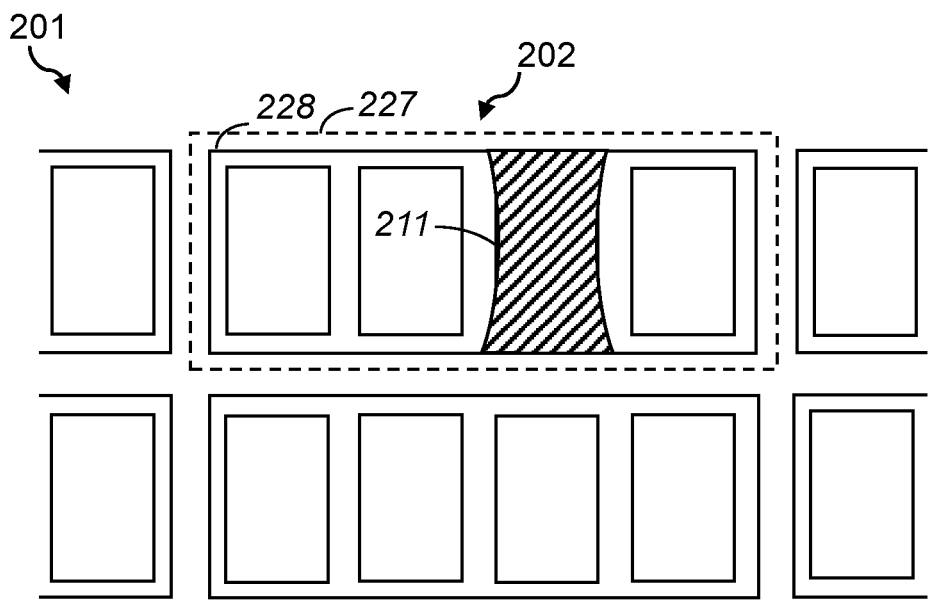

In this example, the second configuration of FIG. 7b is also an intermediate configuration. Thus, in this example, and in response to the input data indicative of the first grey level, the control system is operable to apply, subsequently to the second voltage, a third voltage between the second fluid and the third electrode 217c to contract the first fluid by configuring the first fluid and the second fluid in a third configuration with the second fluid in contact with at least part of the third portion. An example of the third configuration is illustrated in FIG. 7c. In this example, the second fluid is in contact with the first portion, the second portion and the third portion and the first fluid 211 is in contact with at least part of (in this example substantially all, for example more than 90% of) the first portion. The third configuration for example corresponds with the first grey level and thus for example allows a proportion of light to be transmitted to display a display state corresponding to the first grey level.

The first, second and third voltages are applied sequentially, for example with the second voltage applied after the first voltage and the third voltage applied after the second voltage, in the example of FIGS. 7a to 7c. This may improve the control of the retraction of the first fluid 211, for example so that the first fluid 211 retracts from the left of the electrowetting element 202 to the right side rather than the other way round or rather than the first fluid 211 retracting in two opposite directions from a more central region of the surface. However, in other examples, as the skilled person will appreciate, the first, second and third voltages may be applied at the same time, simultaneously, or substantially simultaneously, such as simultaneously within measurement errors, as each other.

Figure 7E:
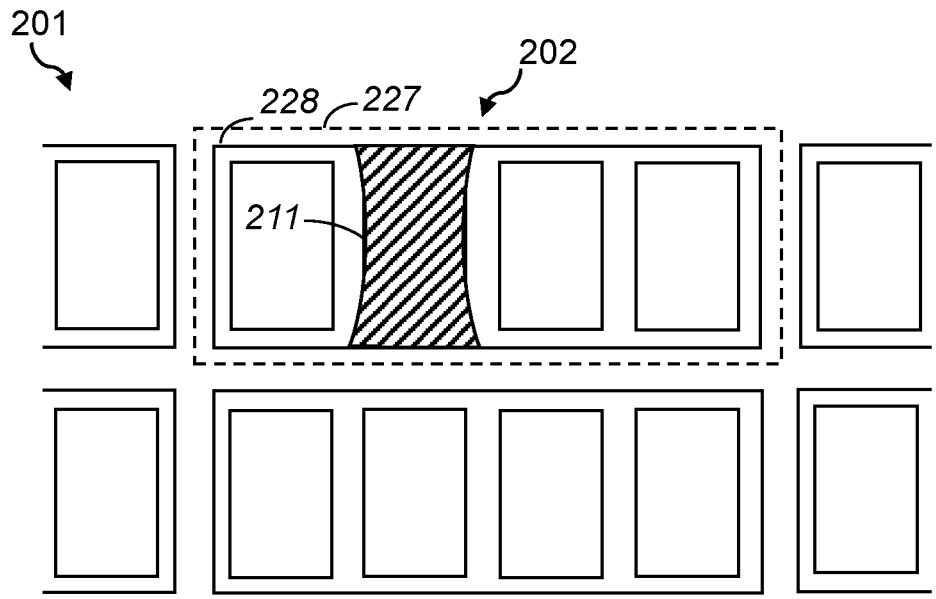
Figure 7F:
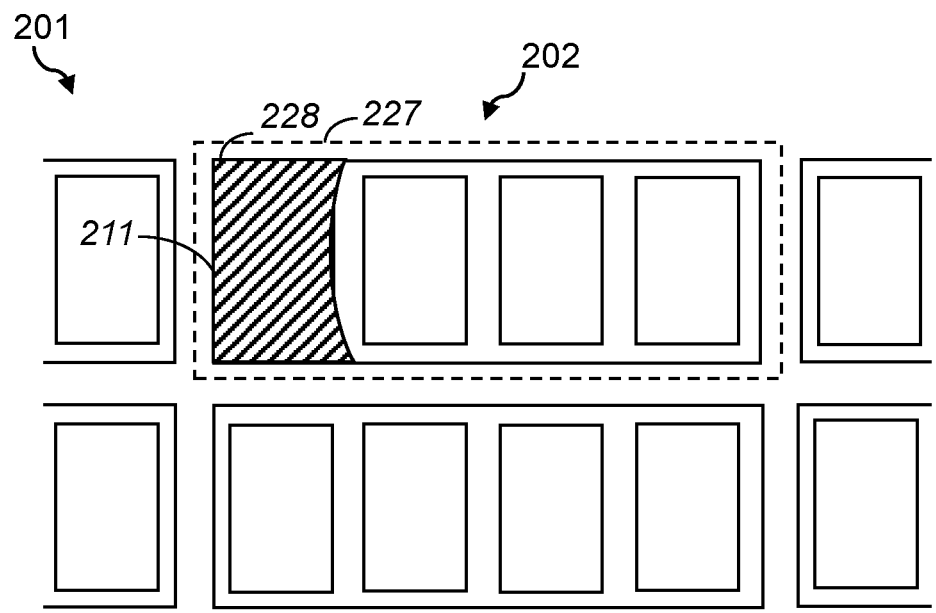
Figure 7G:
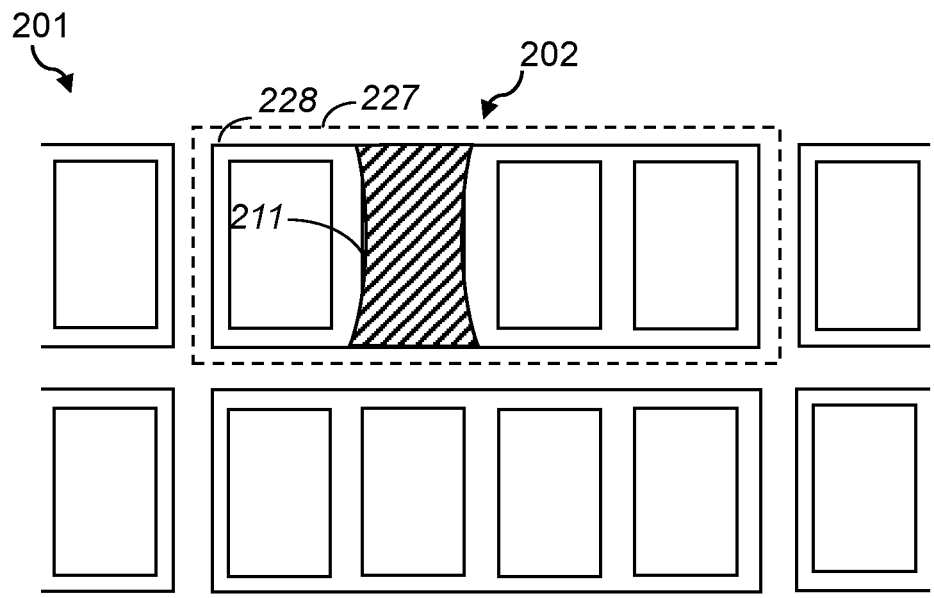

In the example of FIGS. 7a to 7g, after the first fluid 211 is configured to adjoin or contact an extent of the first support plate that corresponds to the first grey level, the first fluid 211 may then subsequently be translated across the surface, for example to obtain reciprocal motion of the first fluid 211 to improve the contrast ratio of the electrowetting element 202 as described above. The first fluid 211 may be translated for example by sequentially or serially applying voltages between different ones of the first, second, third and fourth electrodes 217a, 217b, 217c, 217d and the second fluid. For example, a voltage between the fourth electrode 217d and the second fluid may be applied to translate the first fluid 211 from the position illustrated in FIG. 7c to that shown in FIG. 7d, for example by configuring the first fluid and the second fluid in a fourth configuration with the second fluid in contact with at least part of the fourth portion. Subsequently, a voltage may be applied between the third electrode 217c and the second fluid to move the first fluid 211 from contacting the third portion to contacting the second portion, as shown in FIG. 7e. Similarly, a voltage may then be applied between the second electrode 217b and the second fluid to translate the first fluid 211 to the configuration of FIG. 7f, with the first fluid 211 in contact with the first portion, and then a voltage may be applied between the first electrode 217a and the second fluid to move the first fluid 211 to contact the second portion again, as shown in FIG. 7g. This sequence of voltages may be applied for example while the display effect corresponding to the first grey level is to be shown or displayed by the electrowetting element 202.

Figure 8:
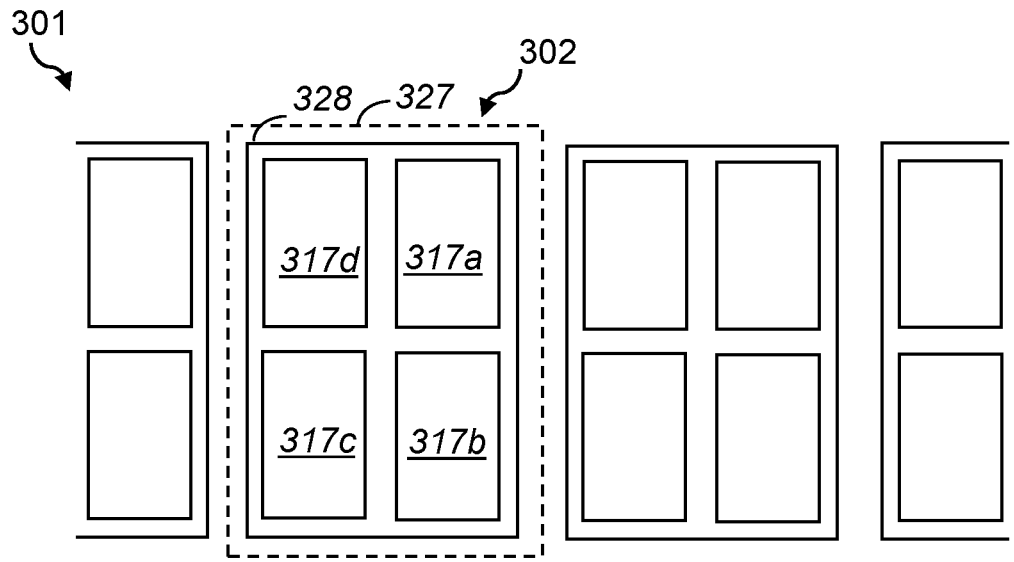
FIG. 8 is a plan view of a part of a yet further example electrowetting display device.

FIG. 8 shows a further example of an electrowetting element 302 in plan view. The first support plate of the electrowetting element 302 of FIG. 8 includes a first electrode 317a, a second electrode 317b, a third electrode 317c and a fourth electrode 317d. The electrowetting element 302 of FIG. 8 is the same as the example electrowetting element 202 of FIG. 6 except for the spatial arrangement of the four electrodes. Accordingly, features of FIG. 8 similar to corresponding features of FIG. 6 are labelled with the same reference numerals but incremented by 100 compared with the reference numerals of FIG. 6; corresponding descriptions should be taken to apply. In FIG. 6, the first, second, third and fourth electrodes 217a, 217b, 217c, 217d are arranged in a row. However, in FIG. 8, the first electrode 317a and the fourth electrode 317d are arranged in a first row and the second electrode 317b and the third electrode 317c are arranged in a second row adjacent to the first row, with the first electrode 317a and the second electrode 317b in a first column and the fourth electrode 317d and the third electrode 317c in a second column adjacent to the first column.

Figure 9A:
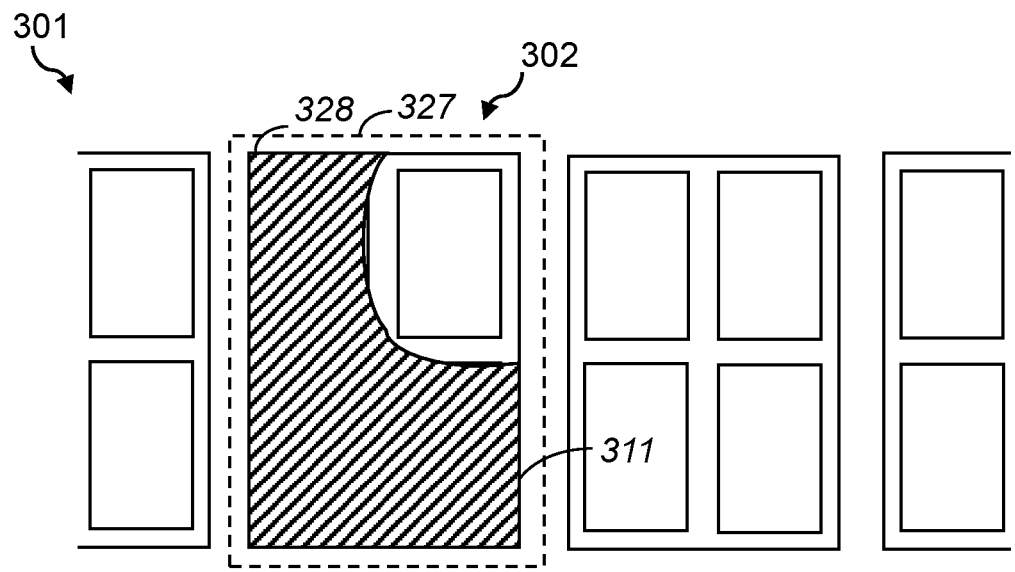
FIGS. 9a to 9c illustrate an example of different fluid configurations for the part of the electrowetting display device of FIG. 8.
Figure 9B:
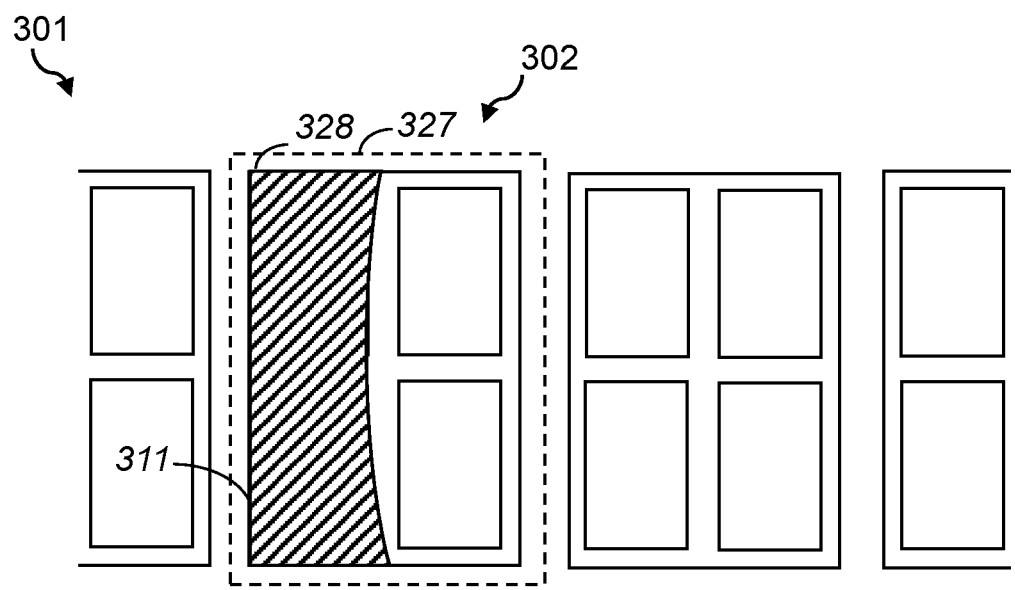
Figure 9C:
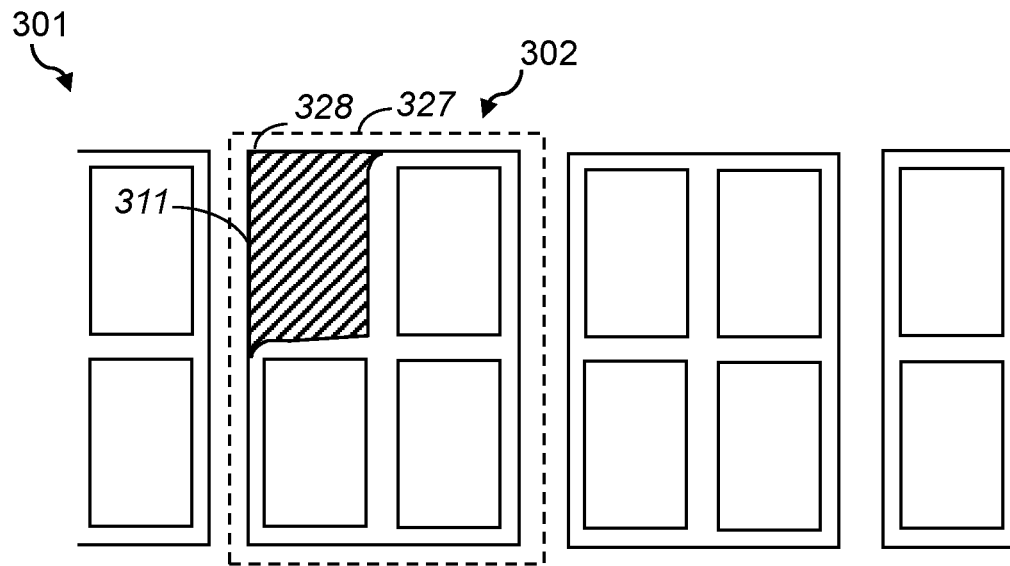

FIGS. 9a to 9c show example fluid configurations that may be obtainable by the electrowetting element 302 of FIG. 8 in response to input data indicative of a first grey level. Prior to FIG. 9a, the electrowetting element 302 is in the off state, with the first fluid 311 covering the surface of the first support plate. Then, the control system of the electrowetting element 302 of FIG. 9a receives input data indicative of a first grey level, which may be a grey level other than the darkest grey level.

In response to the input data, the control system applies a first voltage between the first electrode 317a and the second fluid, then subsequently applies a second voltage between the second electrode 317b and the second fluid and then subsequently applies a third voltage between the third electrode 317c and the second fluid, to configure the first fluid and the second fluid sequentially from the configuration of FIG. 9a (with the first voltage applied), to that of FIG. 9b (with the second voltage applied), to that of FIG. 9c (with the third voltage applied). In this way, the first fluid 311 may be gradually retracted from the surface until it reaches the third configuration, which in this example corresponds with the first grey level. By applying a series of voltages in this way, the motion of the first fluid 311 may be accurately controlled, for example such that the first fluid 311 retracts in a roughly circular fashion across the surface of the first support plate.

After the configuration of FIG. 9c, the voltages between the second fluid and one or more of the first, second, third and fourth electrodes 317a, 317b, 317c, 317d may be removed or reduced, sequentially or at the same or a similar time. In examples, this causes the configuration of the first fluid 311 to gradually reverse to the configuration of FIG. 9a. In some cases, the first fluid 311 may continue to spread out or expand from the configuration of FIG. 9a to contact a larger extent of the surface 14, for example a larger extent of the first portion 318a than in FIG. 9a. For example, a higher voltage may be maintained between the first electrode 317a and the second fluid and between the second electrode 317b and the second fluid than between the third and fourth electrodes 317c, 317d and the second fluid to cause the first fluid to relax or expand from the configuration of FIG. 9c to that of FIG. 9b. Subsequently, a higher voltage may be maintained between the first electrode 317a and the second fluid than between the second, third and fourth electrodes 317b, 317c, 317d to cause the first fluid to further expand from the configuration of FIG. 9b to that of FIG. 9a. Finally, the voltage between the first electrode 317a and the second fluid may be reduced to cause the first fluid to further expand to adjoin or contact a larger extent of the surface than in the configuration of FIG. 9a. With the first fluid 311 expanded in this way, a dark grey level may be obtained, which may be darker than a grey level obtainable with a known electrowetting element. For example, such a dark grey level may be obtained by opening up the electrowetting element 302 (by contracting the first fluid 311) as shown in FIGS. 9a to 9c and then allowing the first fluid 311 to expand as described above. In this way, dark grey levels may be obtained without dithering or repeatedly switching the electrowetting element from a darker state than a desired grey level and a lighter state than the desired grey level. This may therefore simplify the driving or controlling of the electrowetting element and may reduce the appearance of display artefacts due to dithering.

Figure 10A:
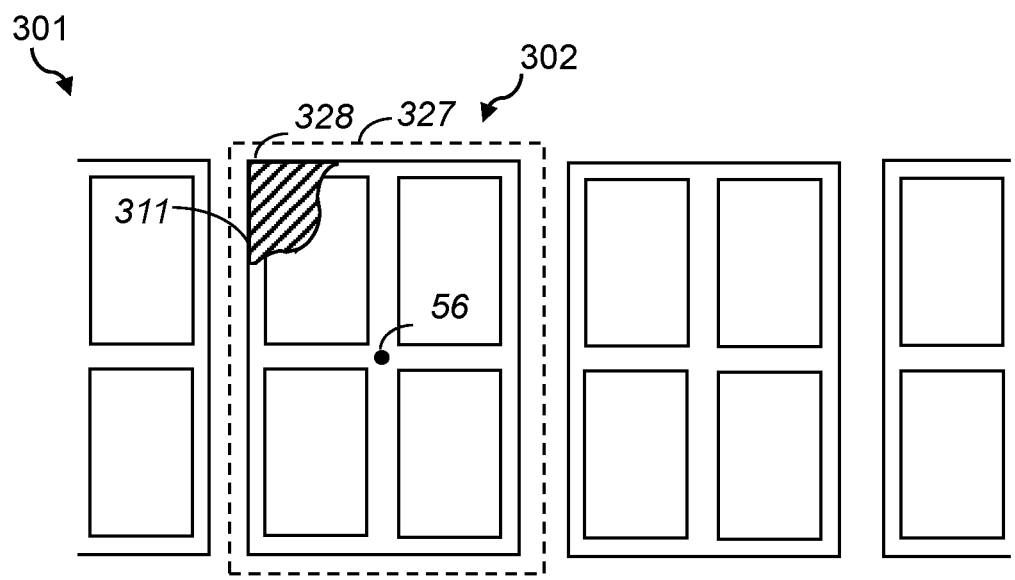
FIGS. 10a to 10f illustrate an example of different fluid configurations for the part of the electrowetting display device of FIG. 8.
Figure 10B:
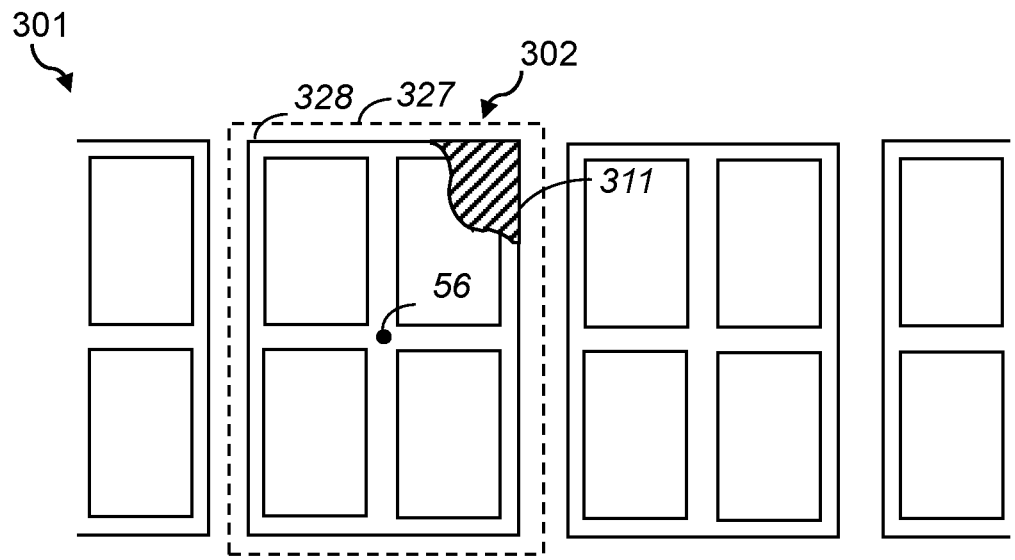

FIGS. 10a to 10f show further example fluid configurations that may be obtained using the electrowetting element 302 of FIG. 8 in response to input data indicative of a second grey level, different from the first grey level. In this example, the second grey level is a lighter grey level, in which the first fluid 311 is to be configured to adjoin or contact a smaller extent of the surface than for the first grey level. In this example, a fourth voltage is applied between the second fluid and the fourth electrode 317d to configure the first fluid and the second fluid in a fourth configuration with the second fluid in contact with at least part of the fourth portion. FIG. 10a shows an intermediate configuration, in which the first fluid 311 is retracted to adjoin part of the fourth portion, before the first fluid 311 is translated to contact the first portion in response to continued application of the fourth voltage, for example in conjunction with ceasing to apply a voltage between the first electrode 317a and the second fluid. Thus, the first fluid 311 continues to move to the fourth configuration, which is illustrated in FIG. 10b, with the first fluid 311 in contact with part of the first portion.

Figure 10C:
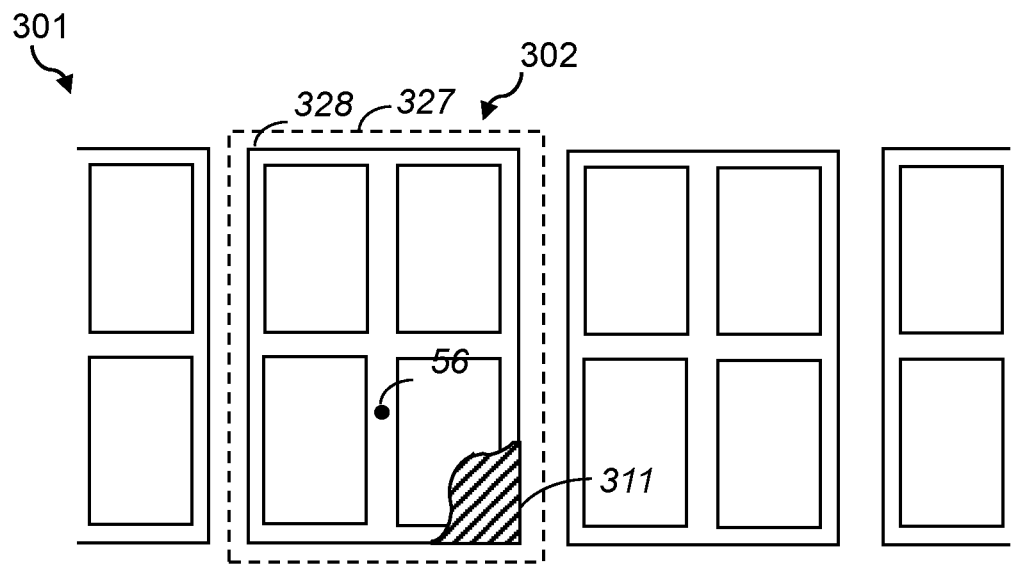

Further in response to the input data indicative of the second grey level, the control system in this example is operable to apply a fifth voltage between the second fluid and the first electrode 317a, a magnitude of the fifth voltage different from a magnitude of the first voltage, to configure the first fluid and the second fluid to a fifth configuration with the second fluid in contact with at least part of the first portion, the fifth configuration different from the first configuration. FIG. 10c illustrates an example of the fifth configuration. As can be seen from a comparison of the first configuration of FIG. 9a, the fifth configuration is indeed different from the first configuration in this example. Moreover, the extent of adjoinment or contact of the first fluid 311 with the surface of the first support plate with the configurations corresponding to the second grey level (illustrated in FIGS. 10a to 10f) are different from this extent with the configuration corresponding to the first grey level (illustrated in FIG. 9c).

Figure 10D:
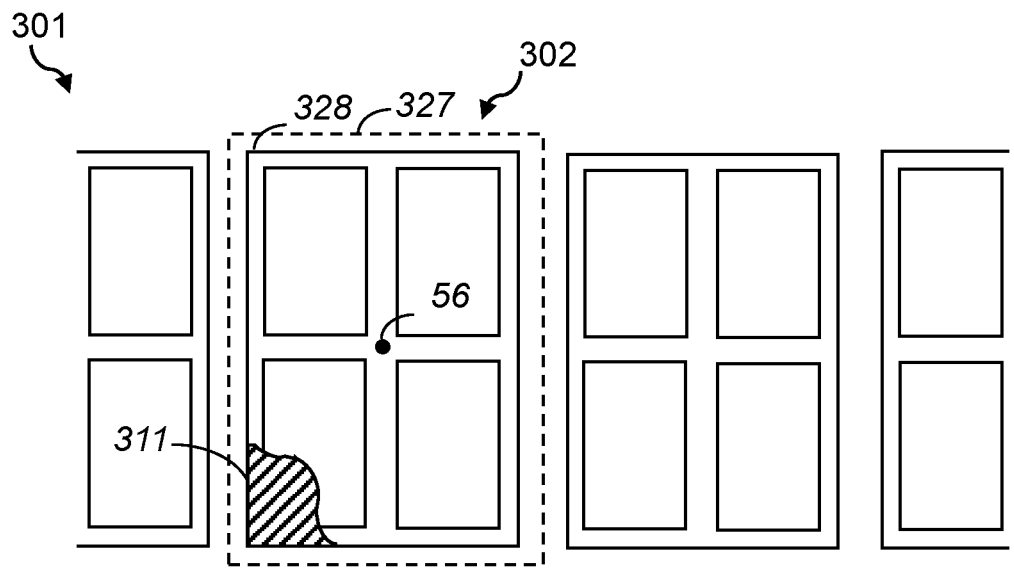
Figure 10E:
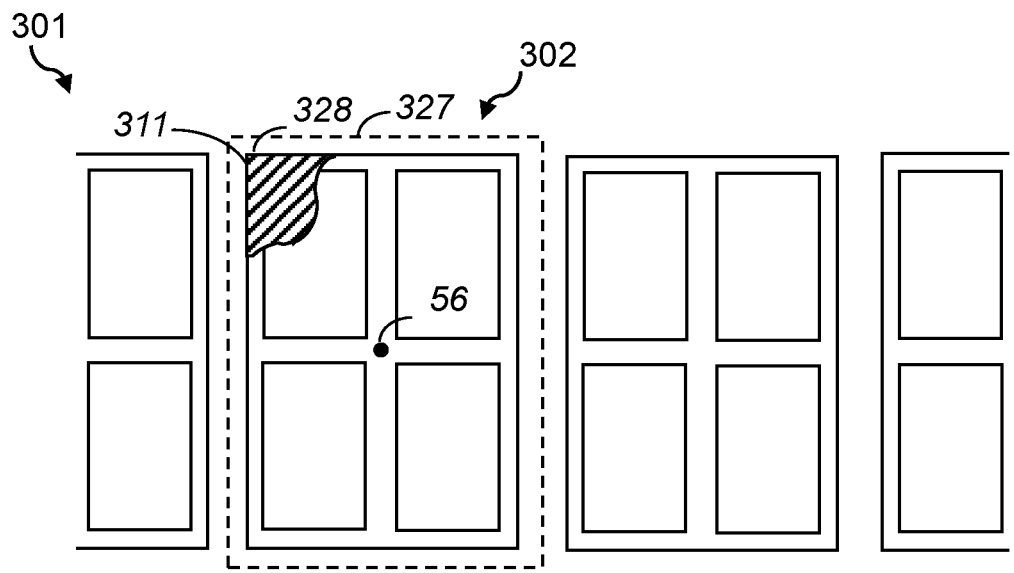
Figure 10F:
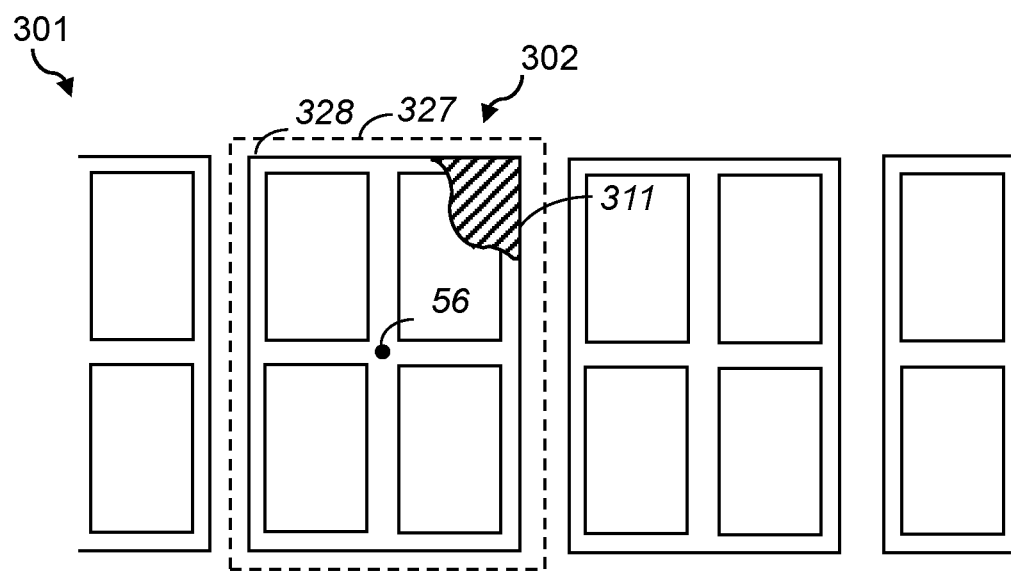

Similarly to the example of FIGS. 7c to 7g, a sequence of voltages may then be applied between the second fluid and the first, second, third and fourth electrodes 317a, 317b, 317c, 317d to continue to translate the first fluid 311 of FIGS. 10d to 10f across the surface of the first support plate. For example, a sequence of voltages such as this may cause rotational motion of the first fluid 311 across the first surface. For example, the rotational motion may be substantially around a center of rotation 56 located between a plurality of portions of the surface, the plurality of portions including the first portion and the second portion, for example around the center of rotation within measurement tolerances. For example, in FIGS. 10d to 10f, it can be seen that the first fluid 311 rotates, or moves in a roughly circular direction, approximately or substantially around a center of rotation 56 corresponding to the center of the electrowetting element 302, which is between the first, second, third and fourth electrodes 317a, 317b, 317c, 317d. Rotational motion such as this may be considered to correspond to a vortex, or a region of the first fluid 311 in which the first fluid 311 flow rotates around an axis, such as an axis corresponding to a center of the surface. Rotational motion of the first fluid 311 may not involve movement of the entirety of the first fluid 311. For example, a central portion of the first fluid 311, or a portion of the first fluid 311 closest to the center of the surface, may sweep across the surface, drawing out a roughly circular path around a point on the surface such as a central point. However, a peripheral portion of the first fluid 311, such as a portion of the first fluid 311 towards an outer region of the surface, may be stationary or substantially stationary, for example with a speed of movement of less than 10% than the speed of movement of the central portion of the first fluid 311.

For example, the control system may be operable to apply a sequence of voltages to translate the first fluid from being at least partly in contact with the first portion (and in contact with or not substantially in contact with the second portion, the third portion and the fourth portion), to being at least partly in contact with the second portion (and in contact with or not substantially in contact with the first portion, the third portion and the fourth portion), to, subsequently, being at least partly in contact with the third portion (and in contact with or not substantially in contact with the first portion, the second portion and the fourth portion), to, subsequently, being at least partly in contact with the fourth portion (and in contact with or not substantially in contact with the first portion, the second portion and the third portion), to, subsequently, being at least partly in contact with the first portion (and in contact with or not substantially in contact with the second portion, the third portion and the fourth portion). As noted above, a fluid may be considered to be not substantially in contact with a portion of the surface where the fluid is not in contact with the portion entirely or within measurement errors or is in contact with an insignificant or relatively small part of the portion such as less than 10% of the portion. For example, the first fluid may be moved consecutively, with no intervening configurations, between at least partial contact with the first portion, the second portion, the third portion, the fourth portion and then the first portion again.

To translate the first fluid in this way, the sequence of voltages may include a third voltage between the second fluid and the third electrode 317c and a fourth voltage between the second fluid and the fourth electrode 317d. For example, with the first voltage applied between the second fluid and the first electrode 317a, the second voltage may have a smaller magnitude than the first voltage and both the third voltage and the fourth voltage may be substantially the same magnitude as (for example, the same magnitude as or the same magnitude within measurement errors as) or a larger magnitude than the first voltage. Similarly, with the second voltage applied between the second fluid and the second electrode 317b, the third voltage may have a smaller magnitude than the second voltage and both the first voltage and the fourth voltage may be substantially the same magnitude as or a larger magnitude than the second voltage. Furthermore, with the third voltage applied between the second fluid and the third electrode 317c, the fourth voltage may have a smaller magnitude than the third voltage and both the first voltage and the second voltage may be substantially the same magnitude as or a larger magnitude than the third voltage. Similarly, with the fourth voltage applied between the second fluid and the fourth electrode 317d, the first voltage may have a smaller magnitude than the fourth voltage and both the second voltage and the third voltage may be substantially the same magnitude as or a larger magnitude than the fourth voltage.

In this way, a region of lowest electric field may be moved sequentially around the electrowetting element 302 from the second portion (with the first voltage applied), to the third portion (with the second voltage applied), to the fourth portion (with the third voltage applied), to the first portion (with the fourth voltage applied). As the first fluid 311 typically moves in a direction or towards a region of lowest electric field, this causes the first fluid 311 to also move sequentially from the second portion, to the third portion, to the fourth portion and, then, to the first portion, causing rotational or roughly circular motion of the first fluid 311 over the surface. Although not illustrated in FIGS. 10a to 10f it is to be appreciated that in examples similar to FIGS. 10a to 10f, the first fluid 311 may repeatedly expand and contract as the first fluid 311 is moved from contacting the first portion, to the second portion, to the third portion, to the fourth portion and back to the first portion. For example, the expansion and contraction of the first fluid 311 may be similar to that illustrated in FIGS. 5a to 5f, with the first fluid 311 expanding from contacting less than all of the first portion to substantially cover the first portion, for example to cover at least 90% of the first portion, and subsequently moving to substantially cover the second portion, for example to cover at least 90% of the second portion, and subsequently retracting to cover a smaller extent of the second portion, and so on as the first fluid 311 moves across the surface.

Figure 11:
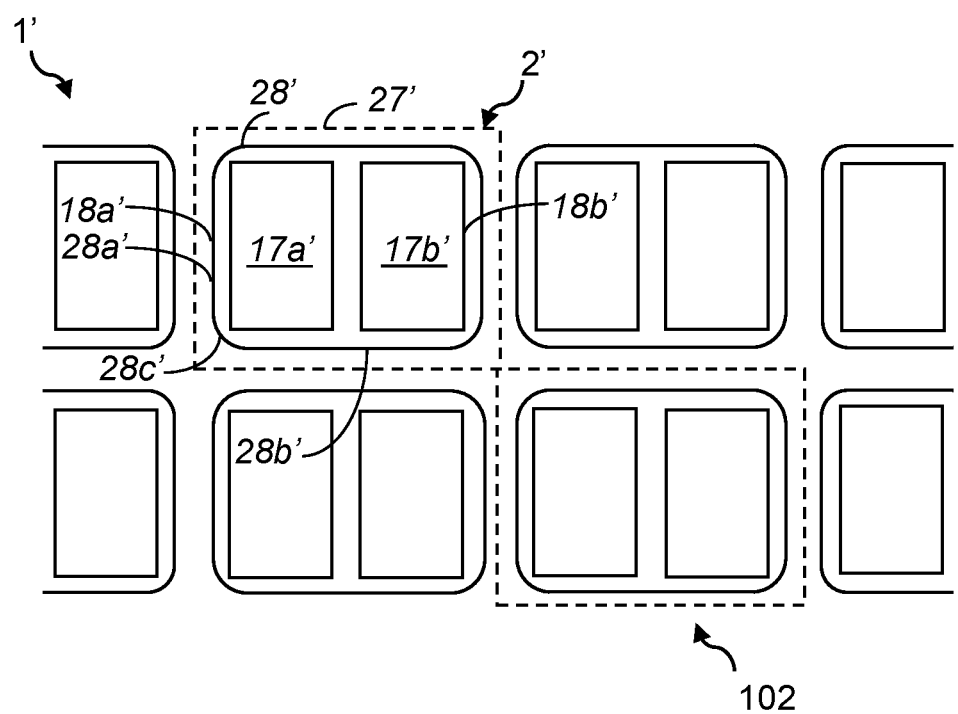
FIG. 11 is a plan view of part of a further example electrowetting display device.

FIG. 11 shows a plan view of part of an example electrowetting display device 1' including an electrowetting element 2'. Other than the shape of the walls of the electrowetting element 2' (and hence the shape of the display area) of FIG. 11, the electrowetting element 2' is the same as the electrowetting element 2 of FIG. 2. Hence, features of FIG. 11 similar to corresponding features of FIG. 2 are labelled with the same reference numerals but with a prime (i.e. a'); corresponding descriptions are to be taken to apply.

In the example of FIG. 11, the at least one wall of the electrowetting element 2' includes a first wall portion, a second wall portion and a third wall portion which connects the first wall portion to the second wall portion. The first wall portion and the second wall portion are each substantially straight in a plane parallel to a plane of the surface of the first support plate of the electrowetting element 2' (which is for example a hydrophobic surface). For example, a substantially straight wall portion may be straight within manufacturing tolerances. The third wall portion is curved in the plane parallel to the plane of the hydrophobic surface. For example, a curvature of the third wall portion may be such that the diameter of a circle having a section corresponding to the curve of the third wall portion, such as a curve following or corresponding to an inner surface of the third wall portion, closest to the display area of the electrowetting element, is less than or equal to a width or half the width of the electrowetting element 2. The third wall portion may be for example at least 10% of a length of the first wall portion or a length of the second wall portion. For example, the third wall portion may be sufficiently curved and/or sufficiently extended so as to aid flow of the first fluid over the surface of the electrowetting element 2', for example to reduce trapping or pinning of the first fluid in a corner of the electrowetting element 2'.

Lines 28a', 28b' and 28c' in FIG. 11 indicate the inner border of the first wall portion, the second wall portion and the third wall portion, respectively, of the electrowetting element 2'. In the example of FIG. 11, the first wall portion is orthogonal or at a right angle to the second wall portion. However, in other examples, the first and second wall portions may be at a different angle with respect to each other. The curve of the third wall portion for example smoothly connects the first wall portion to the second wall portion, for example without a discontinuous, sharp or jagged changed in direction of the wall between the first wall portion and the second wall portion. The third wall portion may therefore correspond with a corner of the electrowetting element, and may therefore provide a curved corner portion.

In the example of FIG. 11, there is a curved third wall portion at each of the corners of the electrowetting element. Thus, in this example, the display area, or the hydrophobic surface of the first support plate, has the shape of a rectangle with curved corners, where it is to be appreciated that a square is an example of a rectangle. In other examples, though, a subset of the corners of an electrowetting element may have a curved third wall portion, with other corners being sharp rather than curved or rounded.

The curved third wall portion may provide a larger intersecting wall region where the electrowetting element 2' meets or adjoins a neighboring electrowetting element than an electrowetting element without a curved third wall portion. For example, a known electrowetting element may have a rectangular or square intersecting wall region, with the first wall portion meeting the second wall portion at a right angle, with no curved portion between the first wall portion and the second wall portion. However, the curved third wall portion typically increases the area of the intersecting wall region as the curved third wall portion is displaced in an inwards direction compared to a point at which the first wall portion would meet the second wall portion at a right angle.

By having a larger intersecting wall region, more robust spacer elements can be located between the first support plate 5 and the second support plate 6 (not shown in FIG. 11), for example with a larger cross-section. As the skilled person will appreciate, spacer elements are typically elongate elements that are used to prevent or reduce movement of the first and second support plates 5, 6 towards each other, for example in response to pressure on one or both of the first and second support plates 5, 6. For example, a spacer element may extend from either one of the first and second support plates 5, 6 to the other one of the first and second support plates 5, 6. With each spacer element being more robust, the total number of spacers in an electrowetting display device may be reduced. This can therefore increase the aperture ratio of the electrowetting display device, which may be reduced by the presence of spacers.

As will be appreciated, other electrowetting elements with different arrangements than that shown in FIG. 11 may also have a curved third wall portion such as that of FIG. 11. For example, the electrowetting elements 2, 202, 302 of FIGS. 2, 6 and 8 may also have one or more curved third wall portions, which may aid or improve the motion of the first fluid in these electrowetting elements, for example by reducing the separation of the first fluid into multiple separate portions or satellites. For example, each of the corners of the electrowetting elements 2, 202, 302 of FIGS. 2, 6 and 8 may have a curved third wall portion, such that the display areas of the electrowetting elements 2, 202, 302 are rectangular with curved corners. In examples in which an electrowetting element comprises a plurality of curved third wall portions, a curvature of one of the third wall portions may differ from that of one or more of the other third wall portions. For example, each third wall portion may have a different curvature from each other third wall portion. It will further be appreciated that, in some cases, electrowetting elements such as those of FIGS. 2, 6 and 8 may not have a curved third wall portion.

Figure 12A:
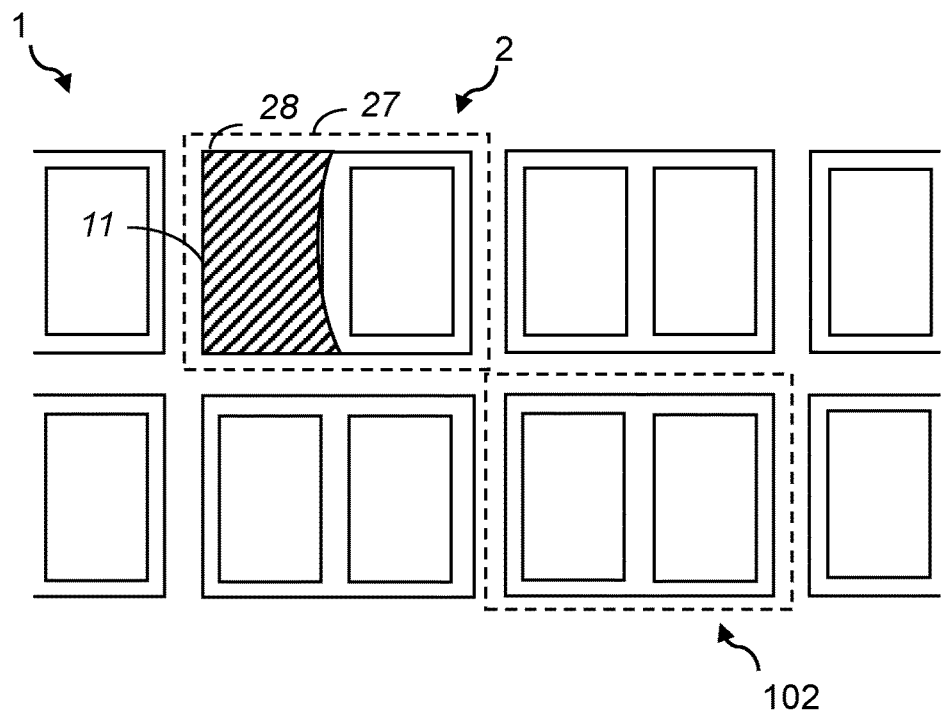
FIGS. 12a to 12c illustrate a yet further example of different fluid configurations for the part of the electrowetting display device of FIG. 2.
Figure 12B:
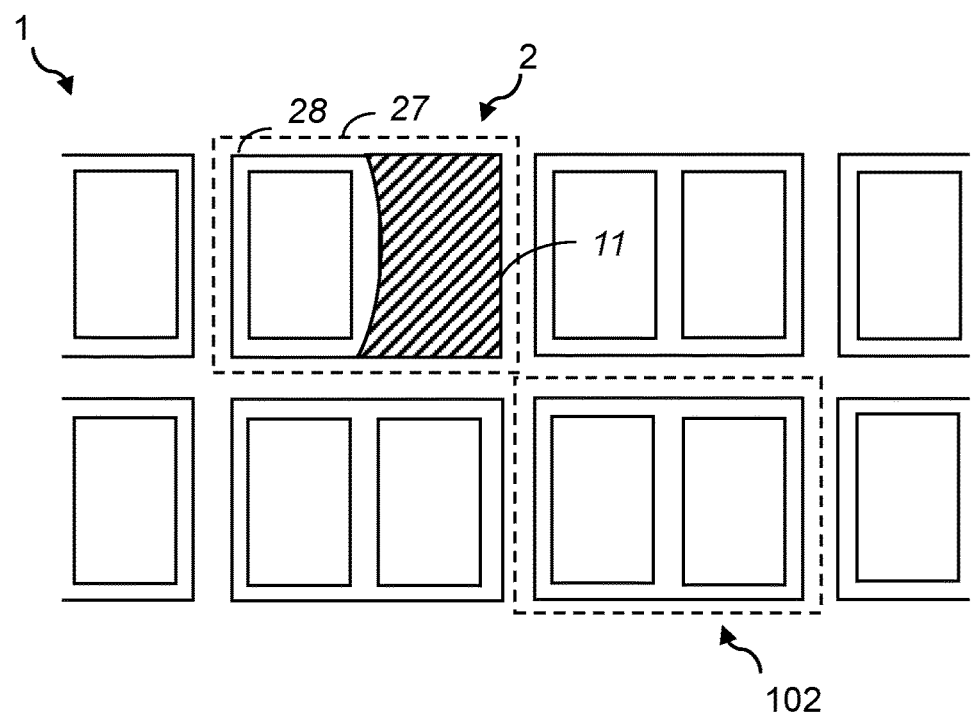
Figure 12C:
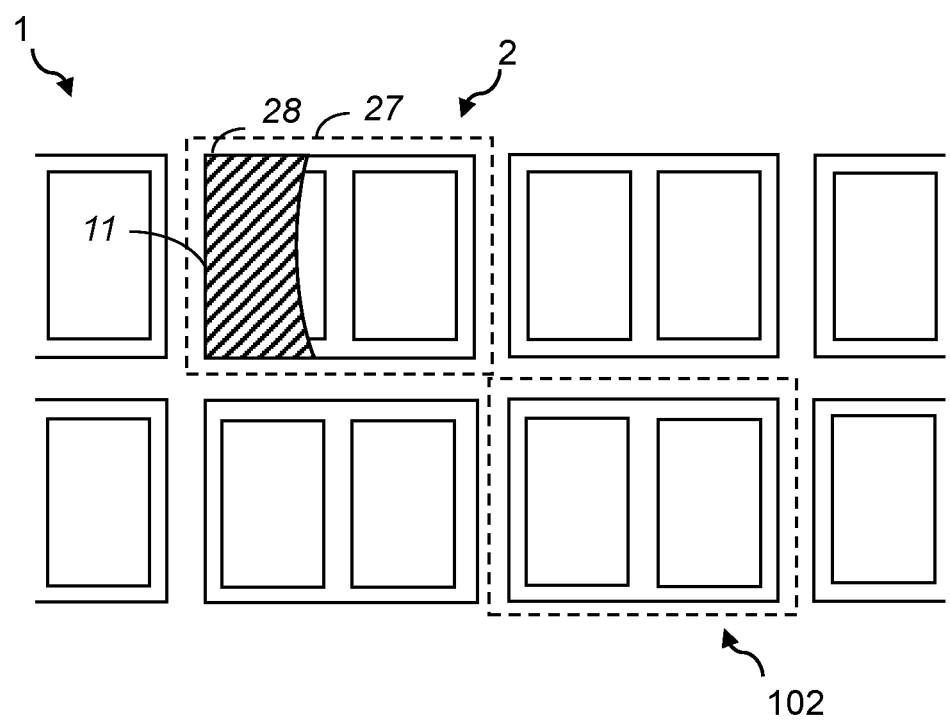

FIGS. 12a to 12c illustrate further different fluid configurations that may be obtained using the example electrowetting element 2 of FIGS. 1 and 2. FIGS. 12a to 12c show the same part of the electrowetting display device 1 illustrated in FIG. 2, with corresponding elements labelled with the same reference numerals. Some of the reference numerals included in FIG. 2 are omitted in FIGS. 12a to 12c, for clarity. It is noted that, although the structure of the electrowetting element 2 of FIGS. 12a to 12c is the same as that of FIGS. 4a and 4b and FIGS. 5a to 5f, the control system is differently configured.

In the example of FIGS. 12a to 12c, the control system is configured or operable to receive first input data indicative of a first grey level and, in response to the first input data, apply a first voltage between the second fluid 12 and the second electrode 17b to configure the first fluid 11 in a retracted configuration with the first fluid 11 at least partly in contact with the first portion but not substantially in contact with the second portion. The control system is further operable to receive second input data indicative of a second grey level and, in response to the second input data, translate the first fluid 11 from contact with the first portion to contact the second portion by application of a second voltage between the second fluid 12 and the first electrode 17a. For example, with the first fluid 11 in contact with the second portion, the first fluid 11 may be absent from or may not contact or may be substantially not in contact with the first portion.

The first grey level is for example a different grey level than the second grey level. In the example of FIGS. 12a and 12b, the second grey level is a lighter or brighter grey level than the first grey level. Hence, the first fluid 11 contacts a smaller extent of the surface with the second voltage applied (FIG. 12b) than with the first voltage applied (FIG. 12a).

In examples, the first voltage to translate the first fluid 11 from contact with the first portion to contact the second portion has a first magnitude and the second voltage has a second magnitude, which may be different from the first magnitude. In such cases, the control system may be operable to receive third data indicative of a third grey level different from the first grey level and, in response to the third input data, translate the first fluid from contact with the second portion to contact the first portion by application of a third voltage between the second fluid 12 and the first electrode 17a with a third magnitude different from the first magnitude, as shown in FIG. 12c. In the example of FIG. 12c, the third grey level is lighter than the first grey level. Hence, the first fluid 11 adjoins a smaller extent of the first portion in FIG. 12c than in FIG. 12a. The control system may be operable to apply the third voltage with the third magnitude consecutively after the second voltage, for example with no intermediate or intervening voltages between the second voltage and the third voltage. In other cases, though, there may be other voltages between the second voltage and the third voltage. As will be appreciated, the voltages described with reference to FIGS. 12a and 12c are merely illustrative and in other examples, the voltages may be of different magnitudes, for example in cases where the second and/or the third grey levels are darker than the first grey level.

Thus, in examples such as FIGS. 12a to 12c, the control system may be configured to alternately switch the first fluid 11 from one side to an opposite side of an electrowetting element in response to different grey levels. This can improve the display quality, as the movement of the first fluid 11 back and forth across the surface of the electrowetting element can improve coalescence of the first fluid 11 with portions or satellites of the first fluid 11 that have separated from a main body of first fluid 11. In contrast, in a known electrowetting element, the first fluid remains pinned or in constant adjoinment with one side of the electrowetting element, and therefore is less able to coalesce with satellites of the first fluid 11, for example satellites at an opposite side or edge of the electrowetting element.

Furthermore, the driving of the electrowetting element in this way may provide similar features to alternating current (AC) driving. For example, the movement of the first fluid 11 with the application of the voltages described with reference to FIGS. 12a to 12c may be more rapid than for a known electrowetting element. The electrowetting element of these examples may therefore have a better or quicker response to data representing large and frequent changes of display effect compared with a known electrowetting element. Moreover, by reversing the direction of motion of the first fluid 11, backflow of the first fluid 11, in which the first fluid 11 tends to flow back to cover the surface despite an applied voltage being maintained, may be reduced. Accordingly, reset pulses, which are typically applied to reduce backflow, may be omitted when using this method of driving. Furthermore, the driving in these examples may have a lower power consumption than alternating current driving.

In further examples in accordance with FIGS. 12a to 12c, the control system is operable to receive fourth input data indicative of a fourth grey level darker than the at least one of the first grey level or the second grey level. In response to the fourth input data, the control system in these examples is operable to apply the first voltage between the second fluid and the second electrode to configure the first fluid in a first retracted configuration with the first fluid at least partly in contact with the first portion but not substantially in contact with the second portion and, subsequently, expand the first fluid by removal or reduction of a magnitude of the first voltage such that the first fluid at least partly contacts the first portion and the second portion. Alternatively, the control system in these examples may be operable to apply the second voltage between the second fluid and the first electrode to configure the first fluid in a second retracted configuration with the first fluid at least partly in contact with the second portion but not substantially in contact with the first portion and, subsequently, expand the first fluid by removal or reduction of a magnitude of the second voltage such that the first fluid at least partly contacts the first portion and the second portion. In this way, dark grey levels, for example darker than those obtainable with a known electrowetting element, may be obtained straightforwardly. The fourth input data may for example be received after, for example consecutively or directly after, the second input data or the third input data. Typically, the first voltage will be applied in response to the fourth input data in examples in which, prior to application of the first voltage, the first fluid is in contact with a larger extent of the second portion than the first portion. Conversely, the second voltage may be applied in response to the fourth input data where, prior to application of the second voltage, the first fluid is in contact with a larger extent of the first portion than the second portion. In this way, the first fluid may be translated by application of the first voltage or the second voltage rather than merely retracted.

As will be appreciated by the skilled person, the principles explained with reference to FIGS. 12a to 12c to obtain a relatively dark grey level may also be applied to other electrowetting display devices or electrowetting elements, such as those with different numbers or arrangements of electrodes. For example, as described above with reference to FIGS. 9a to 9c, a similar approach may be used to obtain relatively dark grey levels in an electrowetting element with four electrodes.

Figure 13:
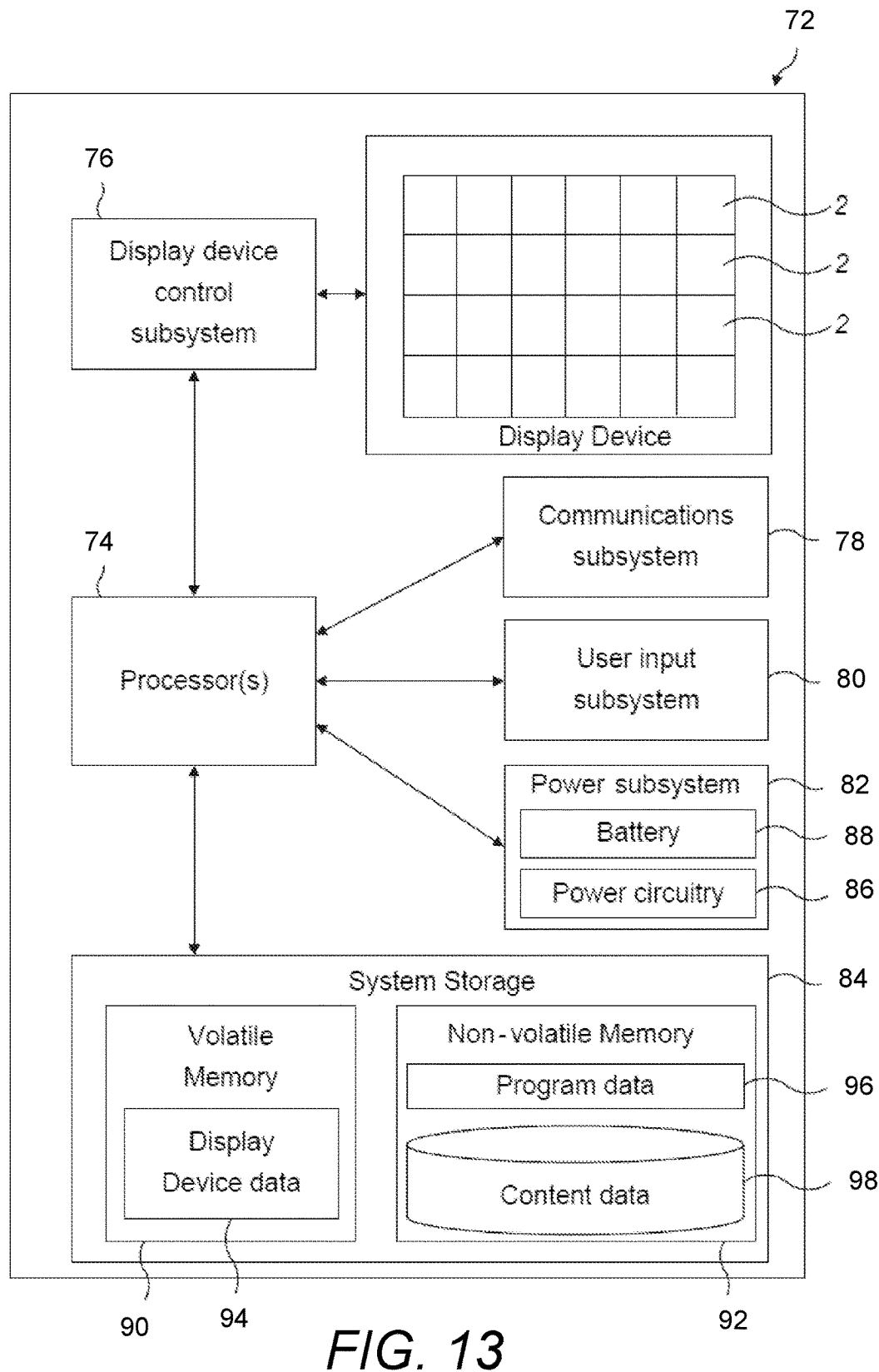
FIG. 13 shows a schematic system diagram of an example apparatus including an electrowetting display device.

FIG. 13 shows schematically a system diagram of an example system, for example an apparatus 72, including an electrowetting display device, an electrowetting element, an electrowetting display unit, or an array of electrowetting elements such as any of the examples described above. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 72. The apparatus 72 includes at least one processor 74 connected to and therefore in data communication with for example: a display device control subsystem 76, which for example may be or include the circuitry 29 of the control system illustrated in FIG. 3, a communications subsystem 78, a user input subsystem 80, a power subsystem 82 and system storage 84. The display device control subsystem is connected to and is therefore in data communication with the electrowetting display device. The at least one processor 74 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 84. The at least one processor may additionally, or in the alternative, contain memory, such as processor registers.

The display device control subsystem 76 for example includes electrowetting display element driver components, for use in applying a voltage to any of the electrowetting elements, to address different such display elements. In examples the electrowetting elements are configured according to an active matrix configuration and the display device control subsystem is configured to control switching elements such as thin film transistors (TFTs) of the apparatus 72 via circuitry to control the electrowetting display elements. The circuitry may include signal and control lines such as those described above, for example with reference to FIG. 3.

The communications subsystem 78 for example is configured for the apparatus to communicate with for example a computing device via a data network, for example a computer network such as the Internet, a local area network, a wide area network, a telecommunications network, a wired network, a wireless network, or some other type of network. The communications subsystem 78 may further for example include an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 80 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 82 for example includes power circuitry 86 for use in transferring and controlling power consumed by the apparatus. The power may be provided by a mains electricity supply or from a battery 88, via the power circuitry. The power circuitry may further be used for charging the battery from a mains electricity supply.

The system storage 84 includes at least one memory, for example at least one of volatile memory 90 and non-volatile memory 92 and may include a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect or grey level provided by the electrowetting display device.

In the example of FIG. 13, the volatile memory 90 stores for example display device data 94 which is indicative of display effects or grey levels to be provided by the electrowetting display device. The at least one processor 74 may transmit data, based on the display device data, to the display device control subsystem 76 which in turn outputs signals to the electrowetting display device for applying voltages to the electrowetting elements, for providing display effects or grey levels from the electrowetting display device.

The non-volatile memory 92 stores for example program data 96 and/or content data 98. The program data 96 is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data 98 is for example data representing content for example for a user; such content may represent any form of media, for example text, at least one image or a part thereof, at least one video or a part thereof, at least one sound or music or a part thereof. Data representing an image or a part thereof is for example representative of a display effect or grey level to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above examples are to be understood as illustrative examples. Further examples are envisaged.

For example, the description above refers to a control system configured to or at least one memory and computer program instructions configured to, with at least one processor, apply voltages to an electrowetting element. It is to be appreciated that application of such voltages may involve determining a voltage with a particular magnitude, generating the voltage with the particular magnitude and transmitting the voltage with the particular magnitude to the electrowetting element for application, which may be performed by the control system or by the least one memory and the computer program instructions, with the at least one processor.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting display device comprising:
   an electrowetting element comprising:
      a first fluid;
      a second fluid immiscible with the first fluid;
      a first support plate;
      a second support plate, the first fluid and the second fluid located between the first support plate and the second support plate,
      wherein the first support plate comprises:
         a surface, the first fluid in contact with at least a portion of the surface;
         a first electrode overlapped by a first portion of the surface; and
         a second electrode overlapped by a second portion of the surface, with the first portion and the second portion not overlapping each other such that the second portion of the surface is absent from between the first portion of the surface and the second support plate; and
   a control system operable to apply a sequence of voltages to configure the first fluid to a plurality of different configurations, each of the plurality of different configurations respectively corresponding to a same grey level, the sequence of voltages comprising:
      a first voltage between the second fluid and the first electrode; and
      a second voltage between the second fluid and the second electrode.

2. The electrowetting display device according to claim 1, wherein an area of contact between the first fluid and the surface is substantially the same for each of the plurality of different configurations.

3. The electrowetting display device according to claim 1, wherein a location of contact between the first fluid and the surface is different for at least two of the plurality of different configurations.

4. The electrowetting display device according to claim 1, wherein the control system is operable to:
   receive first input data indicative of a first grey level;
   in response to the first input data, apply one of:
      a third voltage corresponding to the first grey level between the second fluid and the first electrode; or
      a fourth voltage corresponding to the first grey level between the second fluid and the second electrode;
   receive second input data indicative of a second grey level different from the first grey level; and
   select, consecutively after application of the one of the third voltage or the fourth voltage, one of:
      the first voltage for application between the second fluid and the first electrode; or
      the second voltage for application between the second fluid and the second electrode.

5. The electrowetting display device according to claim 4, wherein the control system is operable to:
   select the first voltage in response to the fourth voltage being applied; and
   apply the first voltage consecutively after the fourth voltage.

6. The electrowetting display device according to claim 4, wherein the control system is operable to:
   select the second voltage in response to the third voltage being applied; and
   apply the second voltage consecutively after the third voltage.

7. A display apparatus comprising:
   an electrowetting element comprising:
      a first fluid;
      a second fluid immiscible with the first fluid;
      a first support plate;
      a second support plate, the first fluid and the second fluid located between the first support plate and the second support plate,
      wherein the first support plate comprises:
         a hydrophobic surface;
         at least one wall corresponding to a perimeter of the hydrophobic surface;
         a first electrode overlapped by a first portion of the hydrophobic surface; and
         a second electrode overlapped by a second portion of the hydrophobic surface, with the first portion and the second portion not overlapping each other such that the second portion of the hydrophobic surface is absent from between the first portion of the hydrophobic surface and the second support plate; and
   at least one processor; and
   at least one memory comprising computer program instructions,
   the at least one memory and the computer program instructions operable to, with the at least one processor:
      apply a sequence of voltages to configure the first fluid to a plurality of different configurations, each of the plurality of different configurations respectively corresponding to a same grey level, the sequence of voltages comprising:
         a first voltage between the second fluid and the first electrode; and
         a second voltage between the second fluid and the second electrode.

8. The display apparatus according to claim 7, wherein an area of contact between the first fluid and the hydrophobic surface is substantially the same for each of the plurality of different configurations.

9. The display apparatus according to claim 7, wherein a location of contact between the first fluid and the hydrophobic surface is different for at least two of the plurality of different configurations.

10. The display apparatus according to claim 7, wherein the at least one memory and the computer program instructions are operable to, with the at least one processor:
   receive first input data indicative of a first grey level;

in response to the first input data, apply one of:
- a third voltage corresponding to the first grey level between the second fluid and the first electrode; or
- a fourth voltage corresponding to the first grey level between the second fluid and the second electrode;

receive second input data indicative of a second grey level different from the first grey level; and select, consecutively after application of the one of the third voltage or the fourth voltage, one of:
- the first voltage for application between the second fluid and the first electrode; or
- the second voltage for application between the second fluid and the second electrode.

11. The display apparatus according to claim 10, wherein the at least one memory and the computer program instructions are operable to, with the at least one processor:
select the first voltage in response to the fourth voltage being applied; and
apply the first voltage consecutively after the fourth voltage.

12. The display apparatus according to claim 10, wherein the at least one memory and the computer program instructions are operable to, with the at least one processor:
select the second voltage in response to the third voltage being applied between the second fluid and the first electrode; and
apply the second voltage consecutively after the third voltage.

13. An electrowetting display device comprising:
an electrowetting element comprising:
- a first fluid;
- a second fluid immiscible with the first fluid;
- a first support plate;
- a second support plate, the first fluid and the second fluid located between the first support plate and the second support plate,
wherein the first support plate comprises:
- a surface, the first fluid in contact with at least a portion of the surface;
- a first electrode overlapped by a first portion of the surface; and
- a second electrode overlapped by a second portion of the surface, with the first portion and the second portion not overlapping each other such that the second portion of the surface is absent from between the first portion of the surface and the second support plate; and
a control system operable to apply a sequence of voltages to translate the first fluid over the surface during display of a first grey level, the sequence of voltages comprising:
- a first voltage between the second fluid and the first electrode; and
- a second voltage between the second fluid and the second electrode.

14. The electrowetting display device according to claim 13, wherein the control system is operable to apply the sequence of voltages to translate the first fluid substantially continuously over the surface during the display of the first grey level.

15. The electrowetting display device according to claim 13, wherein the control system is operable to apply the sequence of voltages to translate the first fluid:
from being at least partly in contact with the first portion; to being at least partly in contact with the second portion; and
to, subsequently, being at least partly in contact with the first portion.

16. The electrowetting display device according to claim 13, wherein the control system is operable to apply the sequence of voltages to translate the first fluid:
from being at least partly in contact with the first portion but not substantially in contact with the second portion;
to being at least partly in contact with the second portion but not substantially in contact with the first portion; and
to, subsequently, being at least partly in contact with the first portion but not substantially in contact with the second portion.

17. The electrowetting display device according to claim 13, wherein the first support plate comprises:
- a third electrode overlapped by a third portion of the surface; and
- a fourth electrode overlapped by a fourth portion of the surface, with the first portion, the second portion, the third portion and the fourth portion not overlapping each other such that the fourth portion of the surface is absent from between the third portion of the surface and the second support plate,
the first electrode and the fourth electrode arranged in a first row and the second electrode and the third electrode arranged in a second row adjacent to the first row, with the first electrode and the second electrode in a first column and the fourth electrode and the third electrode in a second column adjacent to the first column,
wherein the control system is operable to apply the sequence of voltages to translate the first fluid:
from being at least partly in contact with the first portion;
to being at least partly in contact with the second portion;
to, subsequently, being at least partly in contact with the third portion;
to, subsequently, being at least partly in contact with the fourth portion; and
to, subsequently, being at least partly in contact with the first portion,
the sequence of voltages comprising:
- a third voltage between the second fluid and the third electrode; and
- a fourth voltage between the second fluid and the fourth electrode.

18. The electrowetting display device according to claim 17, wherein the control system is operable to apply the sequence of voltages to translate the first fluid:
from being at least partly in contact with the first portion but not substantially in contact with the second portion, the third portion and the fourth portion;
to being at least partly in contact with the second portion but not substantially in contact with the first portion, the third portion and the fourth portion;
to, subsequently, being at least partly in contact with the third portion but not substantially in contact with the first portion, the second portion and the fourth portion; and
to, subsequently, being at least partly in contact with the fourth portion but not substantially in contact with the first portion, the second portion and the third portion.

19. The electrowetting display device according to claim 13, wherein the first voltage has a first magnitude, and the control system is operable to, with the first voltage applied, apply a fifth voltage between the second fluid and the second electrode with a fifth magnitude smaller than the first magnitude.

20. The electrowetting display device according to claim 13, wherein the second voltage has a second magnitude, and the control system is operable to, with the second voltage applied, apply a sixth voltage between the second fluid and the first electrode with a sixth magnitude smaller than the second magnitude.

* * * * *